(12) United States Patent
Matsuoka

(10) Patent No.: US 8,542,419 B2
(45) Date of Patent: Sep. 24, 2013

(54) IMAGE PROCESSING APPARATUS AND IMAGE PROCESSING PROGRAM

(75) Inventor: Taira Matsuoka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 231 days.

(21) Appl. No.: 13/064,860

(22) Filed: Apr. 21, 2011

(65) Prior Publication Data

US 2011/0261424 A1   Oct. 27, 2011

(30) Foreign Application Priority Data

Apr. 23, 2010 (JP) ................................ 2010-100351
Apr. 18, 2011 (JP) ................................ 2011-092407

(51) Int. Cl.
H04N 1/46 (2006.01)
(52) U.S. Cl.
USPC ............ 358/505; 358/515; 358/1.9; 382/254
(58) Field of Classification Search
USPC .......... 358/505, 516, 515, 1.9, 474; 382/275, 382/167, 254
See application file for complete search history.

(56) References Cited

U.S. PATENT DOCUMENTS

| | | | |
|---|---|---|---|
| 7,146,042 B2* | 12/2006 | Chen | 382/167 |
| 7,376,268 B2* | 5/2008 | Shirata et al. | 382/167 |
| 7,433,082 B2* | 10/2008 | Takenaka et al. | 358/2.1 |
| 7,508,552 B2* | 3/2009 | Touura | 358/474 |
| 8,089,656 B2* | 1/2012 | Oota | 358/1.9 |
| 2002/0196472 A1* | 12/2002 | Enomoto | 358/3.26 |
| 2003/0031375 A1* | 2/2003 | Enomoto | 382/255 |
| 2009/0135455 A1* | 5/2009 | Li | 358/487 |
| 2009/0141310 A1 | 6/2009 | Matsuoka | |
| 2009/0237686 A1* | 9/2009 | Yoshida et al. | 358/1.9 |
| 2010/0080458 A1* | 4/2010 | Yamada et al. | 382/167 |
| 2010/0165368 A1 | 7/2010 | Matsuoka | |
| 2011/0058232 A1 | 3/2011 | Matsuoka | |
| 2011/0280479 A1* | 11/2011 | Yamada et al. | 382/167 |
| 2012/0014599 A1* | 1/2012 | Kano | 382/167 |

FOREIGN PATENT DOCUMENTS

| | | |
|---|---|---|
| JP | 2002369012 | 12/2002 |
| JP | 3983101 | 2/2003 |
| JP | 4476203 | 4/2007 |
| JP | 2007251835 | 9/2007 |
| JP | 2009225274 | 10/2009 |
| JP | 2010016703 | 1/2010 |
| JP | 2011-061375 | 3/2011 |

\* cited by examiner

*Primary Examiner* — Negussie Worku
(74) *Attorney, Agent, or Firm* — Harness, Dickey & Pierce, P.L.C.

(57) ABSTRACT

An image processing apparatus includes: a first image processing unit that carries out first image processing on image data depicting a first image; a first determination unit that determines whether the first image is a chromatic image or an achromatic image; a determination control unit that determines whether the second image is a chromatic image or an achromatic image based on at least one of two results, between which one is a result of a determination whether a second image serving as a target of second image processing to be performed after the first image processing is a chromatic image or an achromatic image, and the other is a determination result determined by the first determination unit; and a second image processing unit that carries out the second image processing on the second image based on a result of the determination control unit.

17 Claims, 15 Drawing Sheets

IMAGE PROCESSING APPARATUS AND IMAGE PROCESSING PROGRAM

CROSS-REFERENCE TO RELATED APPLICATIONS

The present application claims priority to and incorporates by reference the entire contents of Japanese Patent Application No. 2010-100351 filed in Japan on Apr. 23, 2010 and Japanese Patent Application No. 2011-092407 filed in Japan on Apr. 18, 2011.

BACKGROUND OF THE INVENTION

1. Field of the Invention

The present invention relates to an image processing apparatus and an image processing program.

2. Description of the Related Art

In an example of digital color copying machines, an image forming process in a full color copying mode is realized by copying processes with regard to four basic colors, i.e., cyan (C), magenta (M), yellow (Y), and black (Bk), so as to output the colors on a piece of transfer sheet. In a monochromatic copying mode, a monochromatic image is output on a piece of transfer sheet in a single copying process. Accordingly, in such a copying machine, a consumed amount of toner differs significantly between the full color copying mode and the monochromatic copying mode, whereby cost spent by a user of a copying machine on copying also varies significantly depending on the modes. In addition, an image output on a transfer sheet significantly differs between the modes for image forming processing. A user, thus, needs to pay attention to a switching in an operational mode between the color copying mode and the monochromatic copying mode, and therefore, should properly switch the operational mode according to a type of an image appearing in an original manuscript (an image in an original manuscript). In order to eliminate such a cumbersome switching in the operational mode, an automatic color selection (ACS) technique is known in which a determination on whether an image in an original manuscript is a chromatic image or an achromatic image is automatically made (color determination) and an operational mode of a copying machine is automatically switched according to a determination result. However, when the color determination process makes an erroneous decision, especially when an achromatic image is erroneously determined as a chromatic image, copying processing may be carried out by using the four colors of CMYK. In such a case, the color of an output image appearing on a transfer sheet may be different from the color that a user may expect and cost and time needed for copying process may be increased. Therefore, high accuracy is required in the color determination.

Recently, the digital color copying machine has acquired high affinity for other apparatuses of digital image data processing to combine a facsimile, printer, and scanner functions, in addition to a copying function, to be called a multi-function printer (MFP). Furthermore, an increase in capacity and a reduction in the cost of producing a recording medium such as a hard disc drive (HDD) has enabled an MFP to be equipped with a large capacity storage medium. A scanned image in an original manuscript or an image input from another medium can be stored in a storage medium with a large capacity. The stored images can be read again and can, be reused for a different application purpose from the application purpose when the images were stored. For example, if an image in an original manuscript transmitted by a delivery scanner function after being scanned by a scanner is stored in an HDD, the image data can be delivered to another MFP different from the MFP that was used to scan the image in the original manuscript, or output later again on a transfer sheet without scanning the image in the original manuscript again by the scanner. In addition, the image in the original manuscript is output at unity magnification when being scanned, and thereafter the image in the original manuscript can be output with a magnification ratio of 200%, for example.

Image region separation processing may be applied to the image in the original manuscript to discriminate whether a region of the image in the original manuscript is a character region or a picture region and to output a discrimination result as an image region separation result, or color determination processing may be applied to the image in the original manuscript to determine whether the image in the original manuscript is a chromatic image or an achromatic image as described above. In the image data processing, switching between different methods of image data processing may occur in accordance with the image region separation result or the color determination result, so that the image region separation processing or color determination processing has to be carried out prior to filtering, color correction processing, or γ processing. For example, Japanese Patent Application Laid-open No. 2007-88783 discloses a technique to store image data and supplementary information (e.g., an image region separation result) of the image data simultaneously. This technique enables the capacity of a storage device to be effectively utilized while keeping quality of the image data stored in the storage device.

However, when data scanned by a scanner is stored in a highly reusable condition as disclosed in Japanese Patent Application Laid-open No. 2007-88783, the image data and the supplementary information need to be stored in such a manner that a user can reuse them by certain methods. (For example, refer to Japanese Patent Application Laid-open No. 2007-251835.) As described above, a user who uses the MFP needs to pay attention to the switching between the color copying mode and monochromatic copying mode, and should properly switch the modes depending on the type of the original manuscript. Accordingly, also when the scanned data is reused, ACS function is required to automatically switch an operational mode of a copying machine based on the color determination result. When the MFP is used as a copying machine, in addition to a problem that an image copied on a transfer sheet can be significantly different from an image that a user may expect, there is another problem in that an erroneous determination to determine an achromatic image as a chromatic image increases a cost in copying and decreases a user's productivity. Furthermore, when the MFP is used as a delivery scanner, a file size becomes large if an achromatic image is erroneously determined as a chromatic image because the chromatic image requires color information whereas the achromatic image requires information on brightness only. As a result, the scanned file size occupies too large a region than necessary in an HDD drive mounted on a user's PC. A color determination result, thus, needs to be stored as supplementary information to a stored image. In Japanese Patent Application Laid-open No. 2007-88783, a color determination result is stored as supplementary information to a stored image. As an increase occurs for cases in which a user uses stored data for various application purposes, an increase also occurs for situations in which a user may reuse the stored data for different purposes than the purposes which were originally intended when the data were stored. Accordingly, a color determination result stored as the supplementary information to the stored data may provide a result which is different from the user's intention. For example, an image in an original manuscript may be output by changing the magnification ratios variously depending on the user's application purposes. In such a case, depending on a magnification ratio, only a part of a scanned image in an original manuscript may be output. In such a case, an output target image that is part of an image in an original manuscript may be an achromatic image though whole of the image in the original manuscript is a chromatic image.

With a technique disclosed in Japanese Patent Application Laid-open No. 2002-369012, both image data and color determination results can be retained for various reusing forms. This technique, however, needs a large storage capacity. For example, when an image data is reused by changing its magnification ratio, it requires a significantly large capacity of an HDD drive mounted on the MFP to keep image data corresponding to all the selectable magnification ratios. In addition, nonconformance may occur if a stored image data is reused at the same magnification ratio as the image in the original manuscript despite that only a color determination result with a magnification ratio of 200% is retained, for example. Then, even if the color determination is carried out for the entire image of the original manuscript in capturing the image in the original manuscript data, a re-examination method for the color determination result may be invented to solve problems that may arise if a user's application purposes are different between when an image in an original manuscript has been stored and when the stored image is reused. Generally, during a period of time between a scanning process of an image data by using a scanner and a storing process of the image data, a predetermined processing is carried out for the purpose of increasing productivity by carrying out minimum sorts of image processing when image data is reused after being stored or providing a user with an apparatus valuable as an MFP by increasing affinity for other apparatuses that are used in processing image data.

Now, there arises the possibility that the image processing that is carried out by the time when the image data is stored may affect adversely to reduce the accuracy of the color determination process. Various kinds of image processing are carried out after scanning an image data and before storing the image data such as a conversion of the image data into an image in a desired color space that does not depend on the scanner's characteristics. Another example is a spatial filtering that is carried out to have a desired characteristic of spatial frequency. Such processing, which may be an optimum image processing for a user to obtain a final output image, is not always an optimum image data processing for the purpose of the color determination.

For example, it is necessary for a user, who wants to have an enhanced image, to set enhancement in spatial filtering. Carrying out the enhancement may also enhance a scanning color deviation appearing in the vicinity of a scanned black character. Namely, it is quite possible that a color with a high chroma may appear in the vicinity of a black character after spatial filtering. On the contrary, if an excessive smoothing is carried out in spatial filtering, the color deviation in the vicinity of a black character is smoothed to decrease the chroma, and a color of a colored character becomes lighter to make the color determination of a chromatic image incapable. Several other cases can be considered. For example, it becomes hardly distinguishable between an color deviation in the vicinity of a black character and a true color due to a change of a γ-characteristic after color space conversion. Another example is gray balance, i.e., a gray balance of an image data obtained by a scanning process using a scanner may be changed in the course of storing the image data to optimize the image data for a final output image. An off-gray balance indicates that a pixel having a relationship "R=G=B" which is held when an image is scanned by a scanner does not keep the relationship in a stored image data, i.e., a reference of an achromatic image is shifted to reduce an accuracy of a color determination. If all the image processing conversions are reversible and inverse conversions can be carried out based on the one-to-one correspondences, color determination can be applied to an image by using the inverse conversion process for each image. However, image processing is usually irreversible by its nature. Also, it costs too much man-hour to carry out parametric design for a color determination in each conversion process. Furthermore, even if parametric design is carried out, very low accuracy of color determination may be acquired if the color determination is applied to an image data which has already passed many kinds of image data processing.

Under the above-described circumstances, color determination accuracy may be deteriorated to a greater extent when color determination processing is carried out on an image having been subjected to image processing suitable for storage as image data than when color determination is carried out on an image immediately after being scanned by using a scanner. In particular, a user rarely accepts color determination result if an achromatic image is erroneously determined as a chromatic image. Accordingly, it is necessary to control image processing carefully by referring to the information indicating whether the whole of an image in an original manuscript is to be output and is subjected to color determination, or what kind of an image editing process, has been applied to a target image for color determination, for example. In addition, when color determination needs to be carried out after image editing processing is carried out, a probability for an occurrence of an erroneous color determination in which an achromatic image is determined as a chromatic image can somewhat increase.

SUMMARY OF THE INVENTION

It is an object of the present invention to at least partially solve the problems in the conventional technology.

According to an aspect of the present invention, there is provided an image processing apparatus, comprising: a first image processing unit that carries out first image processing on image data depicting a first image; a first determination unit that determines whether the first image is a chromatic image or an achromatic image; a determination control unit that determines whether a second image is a chromatic image or an achromatic image based on at least one of two results, between which one is the second image serving as a target of second image processing to be performed after the first image processing is a chromatic image or an achromatic image, and the other is a determination result determined by the first determination unit; and a second image processing unit that carries out the second image processing on the second image based on a determination result of the determination control unit.

According to still another aspect of the present invention, there is provided an image processing apparatus according to claim 9, wherein the determination control unit causes the receiving unit to cancel receiving the determination result from the other image processing apparatus, and determines that the second image is an achromatic image when the determination unit determines that the first image is an achromatic image.

According to another aspect of the present invention, there is provided an image processing apparatus, comprising: N determination units that are provided so as to correspond to any of image processing carried out for N times and determine whether an image serving as a target of corresponding image processing is a chromatic image or an achromatic image, where N is an integer which is equal to or larger than two; a determination control unit that determines whether an image serving as a target of each of the image processing from (M+1)-th image processing onward is a chromatic image or an achromatic image based on at least one result between a result of the determination on an image serving as a target of M-th image processing and a result of the determination on the image serving as the target of the (M+1)-th image processing, where M is an integer which is equal to or larger than one; and at least one image processing unit that carries out the image processing on the image serving as the target of each of the image processing from the (M+1)-th image processing onward based on a result of the determination control unit.

According to still another aspect of the present invention, there is provided an image processing program causing a computer to function as: a first image processing unit that carries out first image processing on image data depicting a first image; a first determination unit that determines whether the first image is a chromatic image or an achromatic image; a determination control unit that receives a result of a determination on whether a second image serving as a target of second image processing performed after the first image processing is a chromatic image or an achromatic image, and determines whether the second image is a chromatic image or an achromatic image based on at least one result between the received determination result and a determination result determined by the determination unit; and a second image processing unit that carries out the second image processing on the second image based on a determination result determined by the determination control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A first embodiment of an image processing apparatus and an image processing program according to the present invention is described below in detail with reference to the accompanying drawings.

First Embodiment

Figure 1:
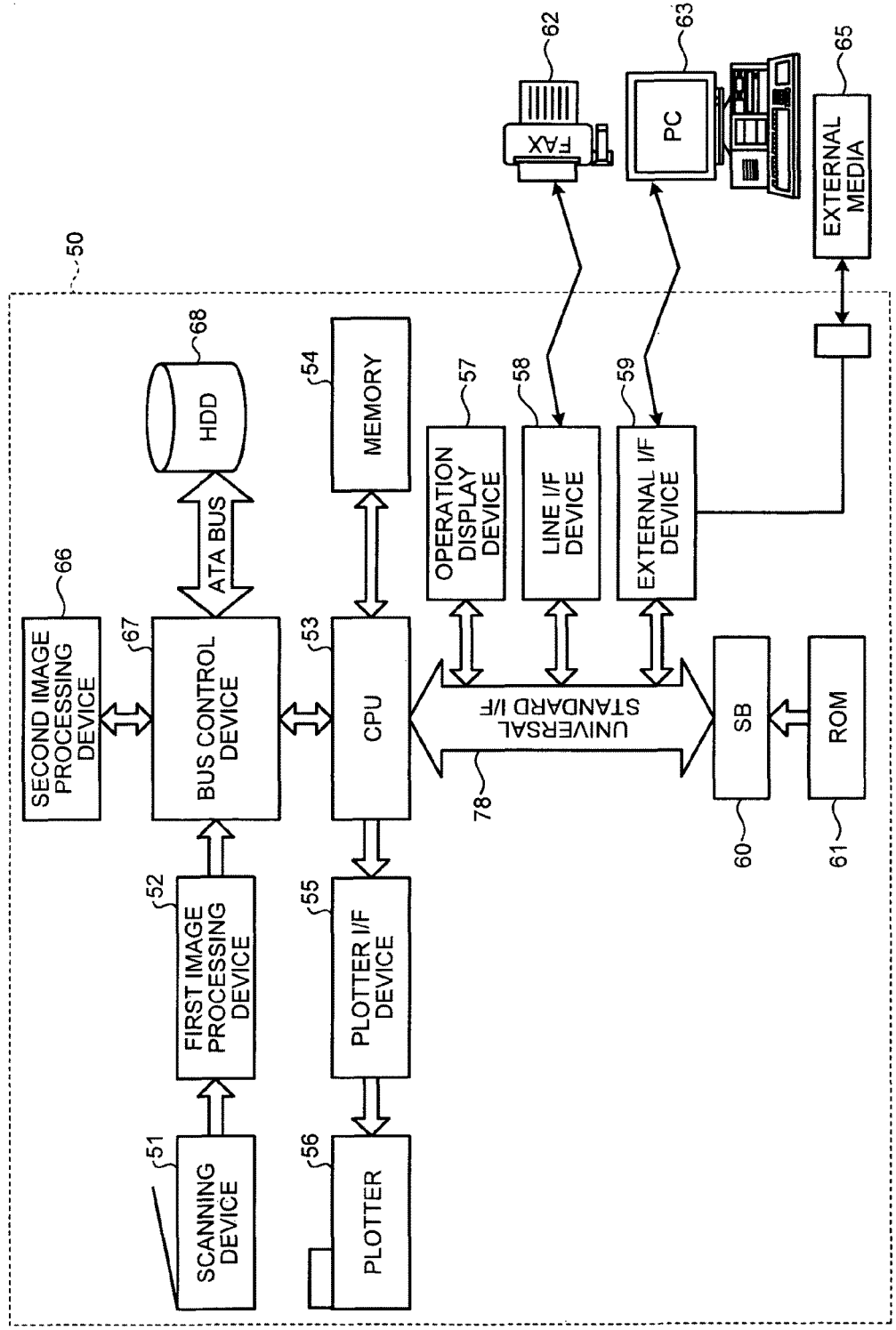
FIG. 1 is a schematic exemplarily illustrating a structure of an image forming apparatus according to a first embodiment of the present invention.

FIG. 1 is a schematic illustrating a structure of an image forming apparatus according to a first embodiment of the present invention. As illustrated in FIG. 1, an image forming apparatus 50 includes a scanning device 51, a first image processing device 52, a second image processing device 66, a bus controller 67, a hard disc drive (HDD) 68, a central processing unit (CPU) 53, a memory 54, a plotter interface (I/F) device 55, a plotter 56, an operation display device 57, a line interface (I/F) device 58, an external interface (I/F) device 59, a south bridge (SB) 60, and a read only memory (ROM) 61. The image forming apparatus 50 has an automatic color control (ACS) function.

The scanning device 51 includes a line sensor composed of charge coupled device (CCD) photoelectric conversion elements, an analog-to-digital (A/D) converter, and a driving circuit which drives the line sensor and the A/D converter (they are not illustrated herein). The scanning device 51 scans an image represented in an original manuscript that is set (images in the original-manuscript) so as to obtain shading information of the images in the original manuscript, produces image data that represents the image in the original manuscript and is of an RGB format represented by data in 8 bits for each of the R, G, and B primaries by using the shading information, and outputs the image data to the first image processing device 52. In the embodiment, a scanning resolution of the scanning device 51 is assumed to be 600 dpi. The resolution, however, is not limited to this.

The first image processing device 52 carries out various image processing on the image data to be output from the scanning device 51 so as to standardize a characteristic of the image data in such a manner that the image data can be used by both the plotter 56 and a PC 63 serving as an external device, for example, and outputs the resulting image data. The first image processing device 52 determines attribute of an image feature on the images in the original manuscript depicted by the image data to be output from the scanning device 51, and outputs a determination result as supplementary information. The first image processing device 52 also carries out various image processing on the image data so as to standardize the characteristic of the image data to a predetermined characteristic, and outputs the resulting image data. The image feature includes features relating to color and quality of an image. The feature relating to color of an image includes a chromatic image, an achromatic image, and a blank original manuscript. The feature relating to quality of an image indicates the feature of an original manuscript serving as a target scanned by the scanning device 51, for example, and includes a language manuscript, original photographs, and a manuscript including both characters and photographs. The classification results as described above become the attributes of the image. In the embodiment, the first image processing device 52 determines whether an image in an original manuscript is a chromatic image or an achromatic image as the attributed feature of the image. The first image processing device 52 carries out image region separation processing, which is described later, and outputs an image region separation result. The detailed structure of the first image processing device 52 is described later.

The bus controller 67 controls data buses that send and receive various data which are necessary in the image forming apparatus 50 such as image data and control command data, and has a bridge function among a plurality of sorts of bus standards. In the embodiment, the bus controller 67 is coupled to the first image processing device 52, the second image processing device 66, and the CPU 53 using a universal standard interface (I/F) 78, and is also coupled to the HDD 68 through an Advanced Technology Attachment (ATA) bus to form an application specific integrated circuit (ASIC). The universal standard I/F 78 is a PCI-Express bus, for example. The bus controller 67 stores image data to be output from the first image processing device 52 and supplementary information of the image data in the HDD 68 by associating them with each other. The supplementary information is described in detail later. The HDD 68 is a large storage device that stores therein various data and programs. In the embodiment, the HDD 68 particularly stores therein image data and supplementary information of the image data by associating them with each other. As an example of the HDD 68, a hard disk drive can be used that is coupled through the ATA bus that is standardized by extending the IDE standard.

The ROM 61 is a non-volatile memory and stores therein a boot program, and various programs and data for copying, scanning, and image processing. The memory 54 is a volatile memory which temporarily stores therein various programs and data. Examples of the memory 54 include a dual inline memory module (DIMM) and the HDD. The memory 54 stores therein various data temporarily exchanged for absorbing processing speed differences in bridging the bus standards, various programs executed by the CPU 53 for controlling the image, forming apparatus 50, and various data used in the execution. Image data is stored as one of the various data. Accordingly, the CPU 53 can freely read image data stored in the memory 54 and write image data in the memory 54. The CPU 53 is a microprocessor that controls the entire image forming apparatus 50. As an example of the CPU 53, an integrated CPU having been increasingly used in recent years is used. The integrated CPU is a microprocessor having various functions added in a CPU core. Specifically, RM11100 manufactured by PMC Corporation is adopted as the CPU 53, for example. The RM11100 has integrated functions to connect to various universal I/F standards such as the PCI-Express bus, and to connect the various universal I/F standards with each other by using a crossbar switch. The CPU 53 normally executes a boot program stored in the ROM 61 on start-up so as to start a system. After the start-up, the CPU 53 loads programs in the memory 54 that can be accessed with a high speed, and executes the programs so as to carry out various processing with a high-speed.

The second image processing device 66, after receiving compressed image data and supplementary information of the compressed image data, a color determination result (referred to as a first color determination result) on an image in an original manuscript, and region designation information that designates a region corresponding to an output target image through the CPU 53 and the bus controller 67, carries out various image processing using them and outputs the image data after the processing. The detailed structure of the second image processing device 66 is described later.

The plotter 56 forms images based on image data, and prints the formed images on transfer sheets as image formation outputs. For example, when receiving image data having been converted into a CMYK format through the plotter I/F device 55, the plotter 56 outputs an image depicted with the image data on transfer sheets by electrophotography processing using laser beams. The plotter I/F device 55 receives the image data having been converted into the CMYK format from the CPU 53 through the universal standard I/F 78 integrated into the CPU 53, and carries out bus bridge processing by which the image data is output to the plotter 56.

The SB 60 is a general-purpose electric device having a bridge function. In the embodiment, the SB 60 bridges the ROM 61 and the universal standard I/F 78. The operation display device 57 integrally includes a display device such as a liquid crystal display (LCD) which displays various kinds of information, and an operating device that has key switches and the like, and receives operation input from a user. Examples of user operation input include: instruction to output a copy of an image or to scan an image; designation, for outputting, of an output size, an output target area of an image in an original manuscript, a magnification ratio, and an image quality mode; designation of a resolution or a scanning area for a delivery scanner; and setting of an ACS mode that automatically determines whether an output target image is a chromatic image or an achromatic image. In addition, the user operation input includes setting of a color mode that directly designates that an output target image is a chromatic image, and a monochromatic mode that directly designates that an output target image is an achromatic image. In the user operation input, an output target image is designated among the images in the original manuscript as a result of the designation of the output target area. The image quality mode indicates a means to deal with image quality of an output target image. Examples of the image quality mode include a character mode in which an output target image is dealt with as a character manuscript, and a photo mode in which an output target image is dealt with as a photographic manuscript. The operation display device 57 outputs, through the universal standard I/F 78, control commands corresponding to such operation inputs to the CPU 53, or displays information outputs from the CPU 53 as a display target.

The line I/F device 58 connects the universal standard I/F 78 to telephone lines. The image forming apparatus 50 exchanges image data with an FAX 62, for example, by facsimile communications through telephone lines connected to the line I/F device 58. The external I/F device 59 connects the universal standard I/F 78 to external devices. The image forming apparatus 50 is coupled to the external devices through the external I/F device 59 so as to exchange various data. Examples of the external devices include the PC 63; and external media 65 such as CompactFlash (registered trademark) cards and SD cards. The external I/F device 59 exchanges various data with the PC 63 and a multifunction peripheral (MFP) serving as a digital MFP (not illustrated) through a network (not illustrated) such as Ethernet (registered trade mark), and with the external media 65 through external media I/F (not illustrated). Particularly when scan delivery processing is carried out, which is described later, output target image data representing the whole or part of images in an original manuscript scanned by the scanning device 51 is sent to the external device such as the PC 63 through the external I/F device 59, for example.

Figure 2:
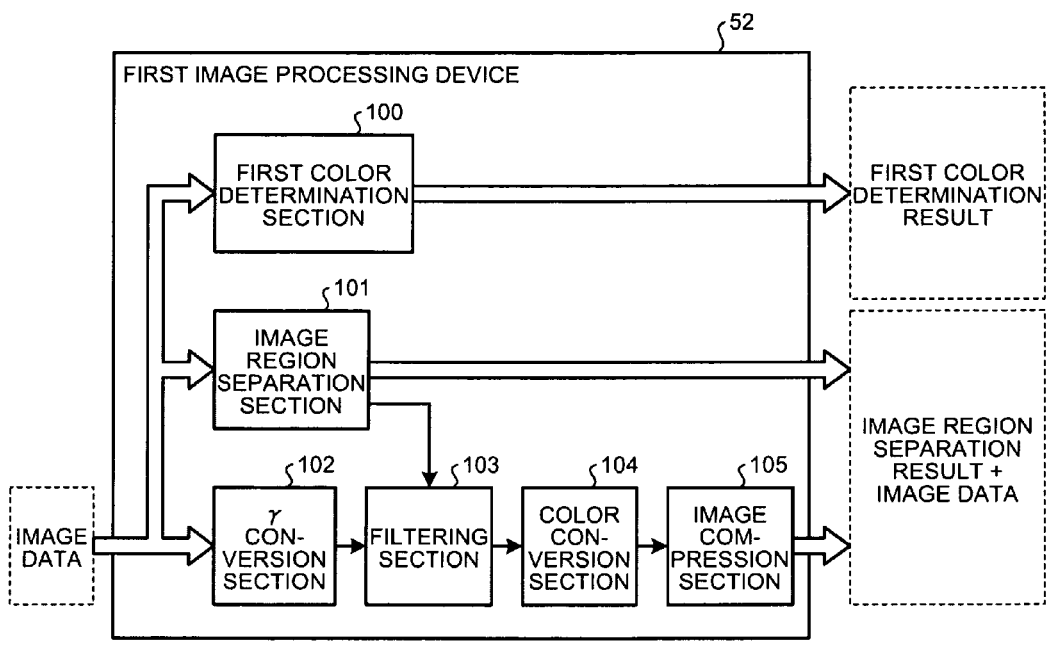
FIG. 2 is a schematic exemplarily illustrating a detailed structure of a first image processing device 52 according to the first embodiment.

The detailed structure of the first image processing device 52 is described below with reference to FIG. 2. The first image processing device 52 includes a first color determination section 100, an image region separation section 101, a γ conversion section 102, a filtering section 103, a color conversion section 104, and an image compression section 105. The γ conversion section 102 receives image data to be output from the scanning device 51. The γ conversion section 102 corrects brightness of the input image data. In the embodiment, the γ conversion section 102 corrects image data to be output from the scanning device 51 as reflectance linear data to luminance linear data. The γ conversion section 102 outputs the corrected image data in the RGB format to the filtering section 103.

The image region separation section 101 receives the image data in the RGB format to be output from the scanning device 51. The image region separation section 101 carries out image region separation processing on the input image data. Specifically, the image region separation section 101 identifies a line drawing region in an image in an original manuscript represented by the input image data in the RGB format, identifies which pixel belongs to which one of character, picture, chromatic, or achromatic region based on a ratio of the line drawing region to a scanned region in a single scanning process, and outputs an identification result as an image region separation result.

Figure 3:
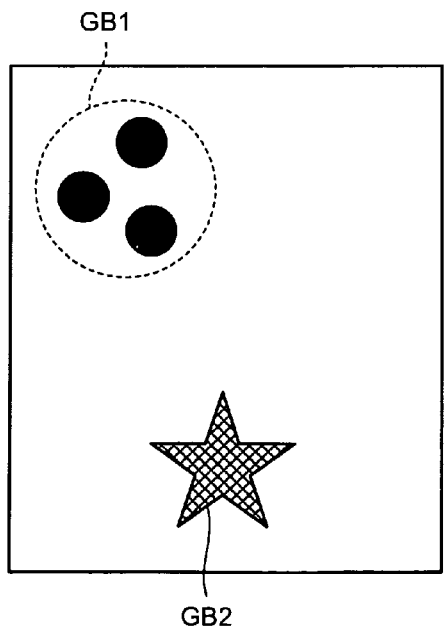
FIG. 3 is a schematic exemplarily illustrating images in an original manuscript.

The first color determination section 100 also receives the image data to be output from the scanning device 51. The first color determination section 100 carries out color determination processing on the input image data in the RGB format in the ACS mode. Specifically, the first color determination section 100 carries out color determination processing in the following manner. Color of the image in the original manuscript represented by the input image data is identified, and then a determination is made on whether the color of the image in the original manuscript obtained in a single scanning process includes white-and-black or other colors than white-and-black, i.e., whether an image is a chromatic image or an achromatic image. In brief, the determination is carried out as follows. The first color determination section 100 determines a pixel included in the input image data as a chromatic pixel if an RGB difference (a maximum–a minimum in the values of RGB) of the pixel is equal to or larger than a predetermined value while the first color determination section 100 determines the pixel as an achromatic pixel if the RGB difference is less than the predetermined value. If the chromatic pixels appear consecutively in a length which is equal to or longer than a predetermined length, the image in the original manuscript is determined as a chromatic image. The predetermined value is preset as a parameter (a color determination parameter). FIG. 3 is a schematic exemplarily illustrating images in an original manuscript. In FIG. 3, an image area GB1 which is a part of the image in the original manuscript is an achromatic image including black-and-white images only whereas an image area GB2 is a chromatic image including colors other than black or white, for example. Accordingly, the original manuscript includes both the achromatic image and the chromatic image and, therefore, the entire image in the original manuscript is determined as a chromatic image. The first color determination section 100 outputs a result of the color determination processing as a first color determination result. Since an identification method of a line drawing region and a method for color determination processing are disclosed in Japanese Patent Application Laid-open No. 2003-46772, for example, detailed description thereof is omitted.

Figure 4:
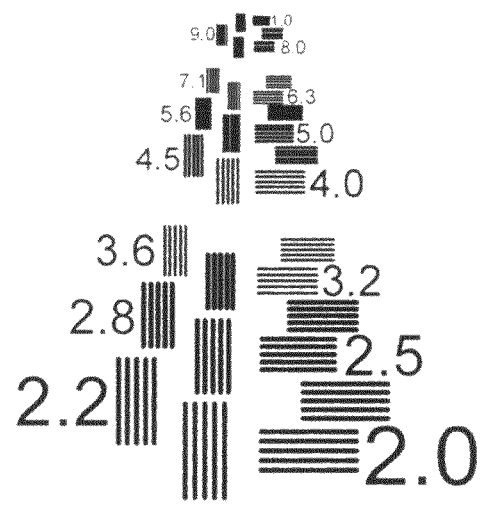
FIG. 4 is a reference chart.

The filtering section 103 carries out filtering on the image data in the RGB format output from the γ conversion section 102 so as to uniform sharpness of the image data to a predetermined characteristic, and outputs the resulting image data. In the embodiment, when a reference chart illustrated in FIG. 4 is scanned, for example, the filtering section 103 corrects modulation transfer function (MTF) characteristic values to a predetermined MTF characteristic values for each predetermined number of lines. In the correction of the MTF characteristic values, the filtering section 103 individually corrects a character region and a picture region because required characteristic values differ between the character region and the picture region. Accordingly, in the embodiment, filtering is properly carried out depending on the image region separation result of the image region separation section 101.

The color conversion section 104 converts colors in the image data to be output from the filtering section 103 into a predetermined RGB space so as to uniform the characteristic of the image data in such a manner that the image data can be used by both the plotter 56 and the PC 63 serving as the external device. The predetermined RGB space is a CIE-RGB space, for example. The color conversion section 104 outputs the image data thus color-converted. The image compression section 105 carries out compression processing on the image data in the RGB format to be output from the color conversion section 104 after the color conversion so as to generate compressed image data. The image compression section 105 may acquire remaining capacity information indicating a remaining storage capacity of the storage capacity of the memory 54 or the HDD 68, for example, and may carry out compression processing on image data by changing a compression rate based on the remaining capacity information.

A unique function is described below that is realized by the CPU 53 executing various programs stored in the ROM 61, the memory 54, or the HDD 68 in the embodiment. The CPU 53 receives, from the first image processing device 52 through the bus controller 67, compressed image data, and the image region separation result and the first color determination result that serves as supplementary information of the compressed image data, and stores the data and the information in the memory 54. The CPU 53 determines an image corresponding to an output target region (referred to as an output target image) of the image in the original manuscript based on operation input that is made through the operation display device 57 to instruct an to be output from the image in the original manuscript. The CPU 53 reads the compressed image data and the supplementary information of the compressed data from the memory 54, and outputs them, through the bus controller 67, to the second image processing device 66 to process the output data. The CPU 53 outputs region designation information that designates an output target region to the second image processing device 66 through the bus controller 67.

Figure 6:
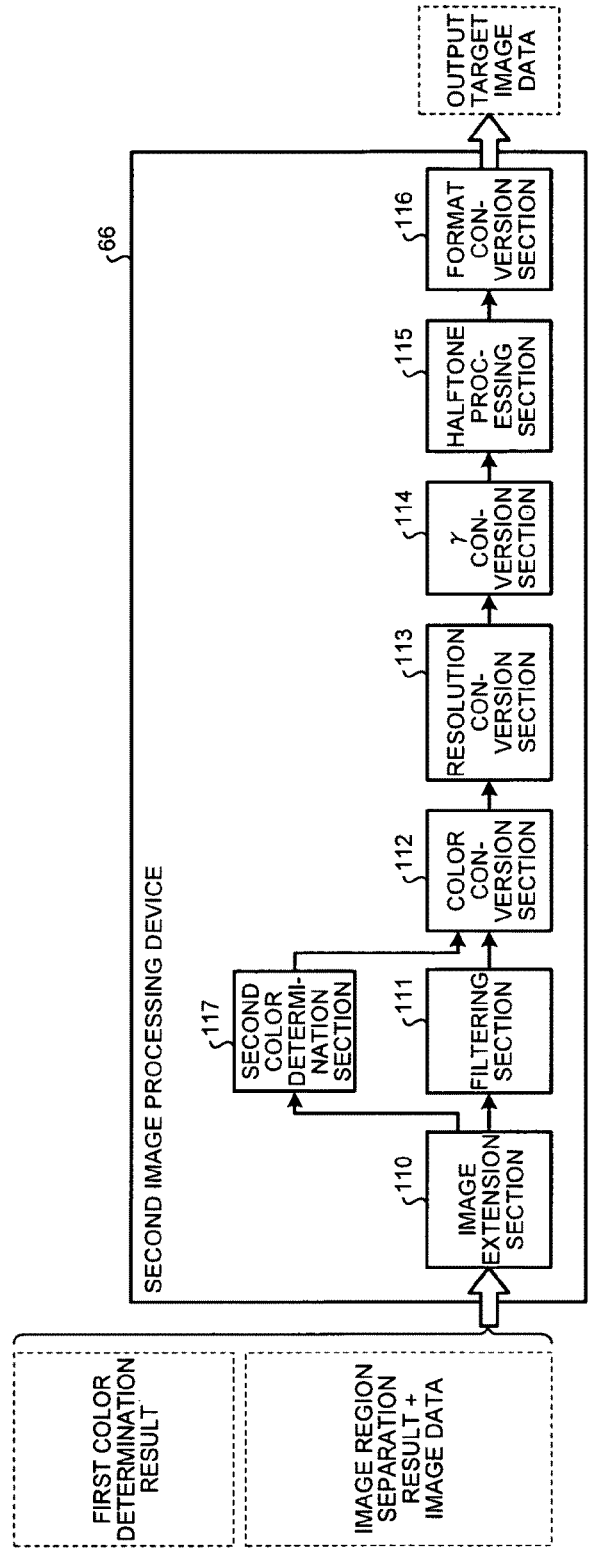
FIG. 6 is a schematic exemplarily illustrating a structure of a second image processing device 66 according to the first embodiment.

The structure of the second image processing device 66 is described below with reference to FIG. 6. The second image processing device 66 includes an image extension section 110, a filtering section 111, a color conversion section 112, a resolution conversion section 113, a γ conversion section 114, a halftone processing section 115, a format conversion/section 116, and a second color determination section 117. The second image processing device 66 receives the compressed data compressed by the first image processing device 52 and supplementary information of the compressed image data that have been stored in the HDD 68, a reliability determination result, and the region designation information through the CPU 53 and the bus controller 67. The image extension section 110 receives and extends the compressed image data, and outputs the resulting data.

The second color determination section 117 carries out color determination processing for determining whether an output target image corresponding to a region designated by the region designation information in an image represented with the image data in the RGB format to be output from the image extension section 110 is a chromatic image or an achromatic image. The color determination processing method carried out by the second color determination section 117 may be the same as or different from that of the first color determination section 100. The second color determination section 117 may carry out color determination processing that is modified sufficiently enough to carry out the processing on an output target image after the image processing of the first image processing device 52. The second color determination section 117 outputs a result of the color determination processing as a second color determination result.

The filtering section 111 carries out the following filtering on the output target image corresponding to the region designated by the region designation information in relation to the image data in the RGB format to be output from the image extension section 110. The filtering section 111 corrects the sharpness of the output target image in such a manner that the output target image is well reproduced when being output to the plotter 56. Specifically, the filtering section 111 carries out sharpness processing or smoothing processing with reference to the image region separation result included in the supplementary information of the image data. For example, the filtering section 111 carries out sharpness processing on a character region so as to enhance readability of characters by sharpening the characters while the filtering section 111 carries out smoothing processing on a picture region so as to smooth an image. The filtering section 103 included in the first image processing device 52 converts the MTF characteristic values into predetermined MTF characteristic values for each predetermined number of lines to enhance reusability of image data. On the other hand, the filtering section 111 included in the second image processing device 66 carries out image editing processing for editing an image according to a user's application purposes. For example, when a user designates the character mode for the image quality mode, the degree of the sharpness processing is increased while the degree of the smoothing processing is increased when a user designates the photographic mode for the image quality mode. The filtering section 111 outputs output target image data representing the output target image after the correction.

The color conversion section 112 carries out color-conversion on the output target image data to be output from the filtering section 111 according to an output destination. In the ACS mode, the color conversion section 112 determines a color determination as a final result (referred to as a final color determination result) on the output target image based on at least one result between the first color determination result included in the supplementary information and the second color determination result to be output from the second color determination section 117, and carries out color-conversion according to an output destination based on the final color determination result.

Figure 5:
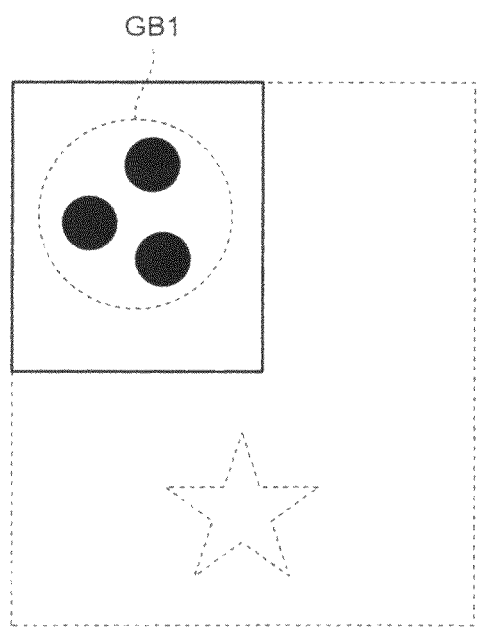
FIG. 5 is a schematic exemplarily illustrating an output target image when the image in the original manuscript exemplarily illustrated in FIG. 3 is enlarged with a magnification ratio of 200%.

The final color determination result is described below. For example, when a user designates, through the operation display device 57, that the image in the original manuscript exemplarily illustrated in FIG. 3 is output with a magnification ratio of 200%, the upper left quarter area of the image in the original manuscript, as exemplarily illustrated in FIG. 5, is determined as the output target image. In this case, the output target image is an achromatic image while the image in the original manuscript exemplarily illustrated in FIG. 3 includes an achromatic image and a chromatic image. Because the second color determination section 117 carries out color determination processing on an output target image that is the whole or a part of an image in an original manuscript, not on the image in the original manuscript. Thus, in the color determination processing, the second color determination section 117 determines that the output target image is an achromatic image. If the whole of the image in the original manuscript is an achromatic image, the second color determination section 117 naturally determines that an output target image is an achromatic image in the color determination processing on the output target image. The second color determination result that is the result of the color determination processing of the second color determination section 117 may differ from the first color determination result that is the result of the color determination processing of the first color determination section 100 when the sizes of an image in an original manuscript and an output target image differ, such as a case where the output target image is taken from an achromatic image included in the image in the original manuscript including achromatic images and chromatic images. However, if the whole of the image in the original manuscript is an achromatic image, an output target image can be determined as an achromatic image in color determination processing on the output target image even if the output target image is taken from any part of the image in the original manuscript, or the output target image is subjected to spatial processing such as translation and rotation, or filtering such as sharpness processing and smoothing processing. If the first color determination section 100 carries out color determination processing with sufficiently high accuracy and determines that an image in an original manuscript is an achromatic image, the second color determination section 117 never determines that an output target image that is the whole or a part of the image in the original manuscript is a chromatic image. If it was determined that the output target image was a chromatic image, the second color determination section 117 would carry out erroneous determination. In the embodiment, taking into consideration that the color determination accuracy of the first color determination section 100 is relatively higher than that of the second color determination section 117, the color conversion section 112 of the second image processing device 66 determines that an output target image is an achromatic image irrespective of the color determination result of the second color determination section 117 when an image in an original manuscript is determined as an achromatic image as a result of the color determination processing of the first color determination section 100. When this procedure is implemented, the color determination processing result determined as an achromatic image is defined as a logical value of "0" while the color determination processing result determined as a chromatic image is defined as a logical value of "1". Then, a logical AND may be calculated between the first color determination result that is the color determination result of the first color determination section 100 and the second color determination result that is the color determination result of the second color determination section 117. When the logical AND is adopted as a final color determination result, the result of the logical AND is always "0" when the first color determination section 100 determines that an image in an original manuscript is an achromatic image (the first color determination result is "0"). Consequently, the final color determination result that an output target image is an achromatic image can be obtained irrespective of the color determination result of the second color determination section 117. On the other hand, the result of the logical AND becomes always the same as the second color determination result when the first color determination section 100 determines that an image in an original manuscript is a chromatic image (the first color determination result is "1"). Consequently, the second color determination result is determined as the final color determination result.

For example, when the image forming apparatus 50 is in copying operation and the output destination is the plotter 56, the color conversion section 112 color-converts image data in the RGB format for which each of the RGB has 8 bits into image data in the CMYK format with 8 bits for each of the C, M, Y, and K primaries in a color space of the plotter 56 if the final color determination result is obtained that an output target image is a chromatic image. If the final color determination result is obtained that an output target image is an achromatic image, the color conversion section 112 color-converts image data with 8 bits for each of the R, G, and B primaries into image data for which only K among four of the C, M, Y, and K primaries in the CMYK format has an 8-bit data. When the image forming apparatus 50 is in delivery scanner operation and the output destination is an external device such as the PC 63, the color conversion section 112 color-converts image data with 8 bits for each of the R, G, and B primaries in a CIE-RGB space into image data with 8 bits for each of the R, G, and B primaries in an Adobe-RGB space suitable for monitor display, for example, if the final color determination result is obtained that an output target image is a Chromatic image. The color conversion section 112 color-converts image data with 8 bits for each of the R, G, and B primaries in a CIE-RGB space into image data in an 8-bit grayscale format if the final color determination result is obtained that an output target image is an achromatic image. While the Adobe-RGB color space is exemplified herein, image data may be converted into other standard color spaces such as an sRGB color space.

The reason why the accuracy of color determination of the first color determination section 100 is relatively high is described below. In the implementation of the above-described sharpness processing, the filtering section 103 of the first image processing device 52 carries out enhancement processing on an image in an original manuscript so as to increase the sharpness level of an output target image. In the enhancement processing, image is enhanced by increasing the enhancement level in the filtering processing. The structure of the enhancement processing is described later. A potentially large problem in color determination processing is that if a scanning color deviation occurs in the vicinity of a black character or a black line during scanning by using the scanning device 51, it is difficult to distinguish erroneously determined colored characters or lines from truly colored lines. Furthermore, when edge enhancement processing is carried out, erroneously determined colors in the vicinity of a black character are also enhanced if the scanning color deviation occurs in the vicinity of the black character to make the erroneously determined colors more vivid. In this case, if the first color determination section 100 and the second color determination section 117 use electronic circuits having an exactly same structure, performance for the color determination processing in the second color determination section 117 is adversely affected and deteriorated because a target image of color determination processing of the second color determination section 117 additionally includes bright coloring as compared with the color deviation in a target image of color determination processing of the first color determination section 100. In other words, the color deviation in the vicinity of the black character or the black line that can be determined as an achromatic image by the first color determination section 100 may be determined as a chromatic image by the second color determination section 117, depending on setting of a color determination parameter. If the color determination parameter is set in such a manner that a bright coloring area around the black character is certainly determined as an achromatic image, unlike the above case, the second color determination section 117 may determine an image as an achromatic image through the first color determination section 100 correctly determines the image as a chromatic image. Practically, the first color determination section 100 and the second color determination section 117 may not use the electronic circuits having an exactly same structure. Even in such an occasion, the performance of the second color determination section 117 is inferior to the performance of the first color determination section 100 in a similar manner as the above-described case. Likewise, the color determination processing performance of the second color determination section 117 is markedly deteriorated when image editing processing to enhance sharpness of an image is carried out according to a user's intention. In such a case, to carry out color determination processing that cannot secure performance can be a large drawback to a user. Specifically, time and toner may be uselessly consumed because of erroneous color determination, or a user may have to carry out operation inputs repeatedly to directly designate a color mode. Accordingly, in such a case, it is beneficial for a user not to utilize the color determination result of the second color determination section 117. For the above-described reasons, the color conversion section 112 obtains the final color determination result that an output target image is an achromatic image irrespective of the color determination result of the second color determination section 117, as described above.

Described below is a structure in which a user is allowed to set the sharpness level of an image, i.e., the enhancement level in a filtering process through the operation display device 57. When the user wants to obtain a clearer (sharper) image than a scanned image in an original manuscript, the user carries out setting to enhance sharpness of the image. Then, image data representing the image in the original manuscript that has been subjected to sharpness processing so as to enhance the sharpness is stored in the HDD 68. As a result, the user does not need to carry out the setting to enhance sharpness of an image being output every time when the image data is reused. The filtering section 103 of the first image processing device 52 carries out filtering processing such as sharpness processing on image data in the RGB format to be output from the γ conversion section 102 according to a sharpness level (enhancement level) set through the operation display device 57, and outputs the image data after the processing. In sharpness processing, the higher the sharpness level becomes, the more an enhancement increases. The bus controller 67 sends the compressed image data to be output from the first image processing device 52 to the CPU 53. In addition, the bus controller 67 sends, besides the image region separation result and the first color determination result, filtering information indicating that the filtering section 103 has carried out the sharpness processing as supplementary information of the compressed image data to the CPU 53. The second image processing device 66 receives the compressed data that has been subjected to various processing such as sharpness processing by the first image processing device 52 and the supplementary information of the compressed data that are output from the first image processing device 52, and region designation information through the CPU 53 and the bus controller 67.

A structure is described below in which a user is allowed to set the smoothness level of an image through the operation display device 57. When the user wants to obtain a smoother (softer) image than a scanned image in an original manuscript, the user carries out setting to enhance smoothness of the image. Then, image data representing the image in the original manuscript that has been subjected to smoothing processing so as to enhance the smoothness is stored in the HDD 68. As a result, the user does not need to carry out the setting to enhance smoothness (smoothness level) of an image being output every time when the image data is reused. The filtering section 103 of the first image processing device 52 carries out filtering processing such as smoothing processing on image data in the RGB format to be output from the γ conversion section 102 according to a smoothness level set through the operation display device 57, and outputs the image data after the processing. In smoothing processing, the higher the smoothness level becomes, the more a smoothing amount increases. The bus controller 67 sends the compressed image data to be output from the first image processing device 52 to the CPU 53. In addition, the bus controller 67 sends, besides the image region separation result and the first color determination result, filtering information indicating that the filtering section 103 has carried out the smoothing processing as supplementary information of the compressed image data to the CPU 53. The second image processing device 66 receives the compressed data that has been subjected to various processing such as sharpness processing by the first image processing device 52 and supplementary information of the compressed image data that are output from the first image processing device 52, and region designation information through the CPU 53 and the bus controller 67.

The resolution conversion section 113 carries out resolution conversion (magnification change processing) on output target image data to be output from the color conversion section 112 according to a magnification ratio designated through the operation display device 57 when an image is enlarged or reduced according to the above designated magnification ratio. Thereafter, the resolution conversion section 113 outputs the output target image data after the conversion. When an image is not subjected to magnification change, the resolution conversion section 113 outputs the output target image data to be output from the color conversion section 112 without carrying out conversion on the output target image data. The γ conversion section 114 converts the output target image data in such a manner that a tone characteristic of the image is converted according to a characteristic of an output destination to which the image is output. When the output destination is the plotter 56, the γ conversion section 114 converts the tone characteristic of the image so as to keep the tone characteristic of the image well according to an output characteristic of the plotter 56. Thereafter, the resolution conversion section 113 outputs the output target image data after the conversion. The halftone processing section 115 carries out gradation level conversion processing on an output target image data in the CMYK format with 8 bits for each of the C, M, Y, and K primaries or an output target image data in an 8-bit K format that is output from the resolution conversion section 113 according to a gradation processing capacity of the plotter 56. For example, the halftone processing section 115 carries out gradation level conversion processing from an output target image data in the CMYK format with 8 bits for each of the C, M, Y, and K primaries or an output target image data in the 8-bit K format that is output from the resolution conversion section 113 to image data in the CMYK format with 2 bits for each of the C, M, Y, and K primaries or in a 2-bit K format by using an error diffusion method which is one of methods for pseudo-halftone processing. Thereafter, the halftone processing section 115 outputs the output target image data after the processing described above. When an output target image is a multi-level image, the halftone processing section 115 outputs output target image data to be output from the resolution conversion section 113 without processing the output target image data.

The format conversion section 116 carries out format conversion on the output target image data to be output from the halftone processing section 115. In the format conversion, JPEG (Joint Photographic Experts Group) compression or MMR (modified modified read) compression is carried out, for example, according to an output application of an image.

Copying Processing

Figure 7:
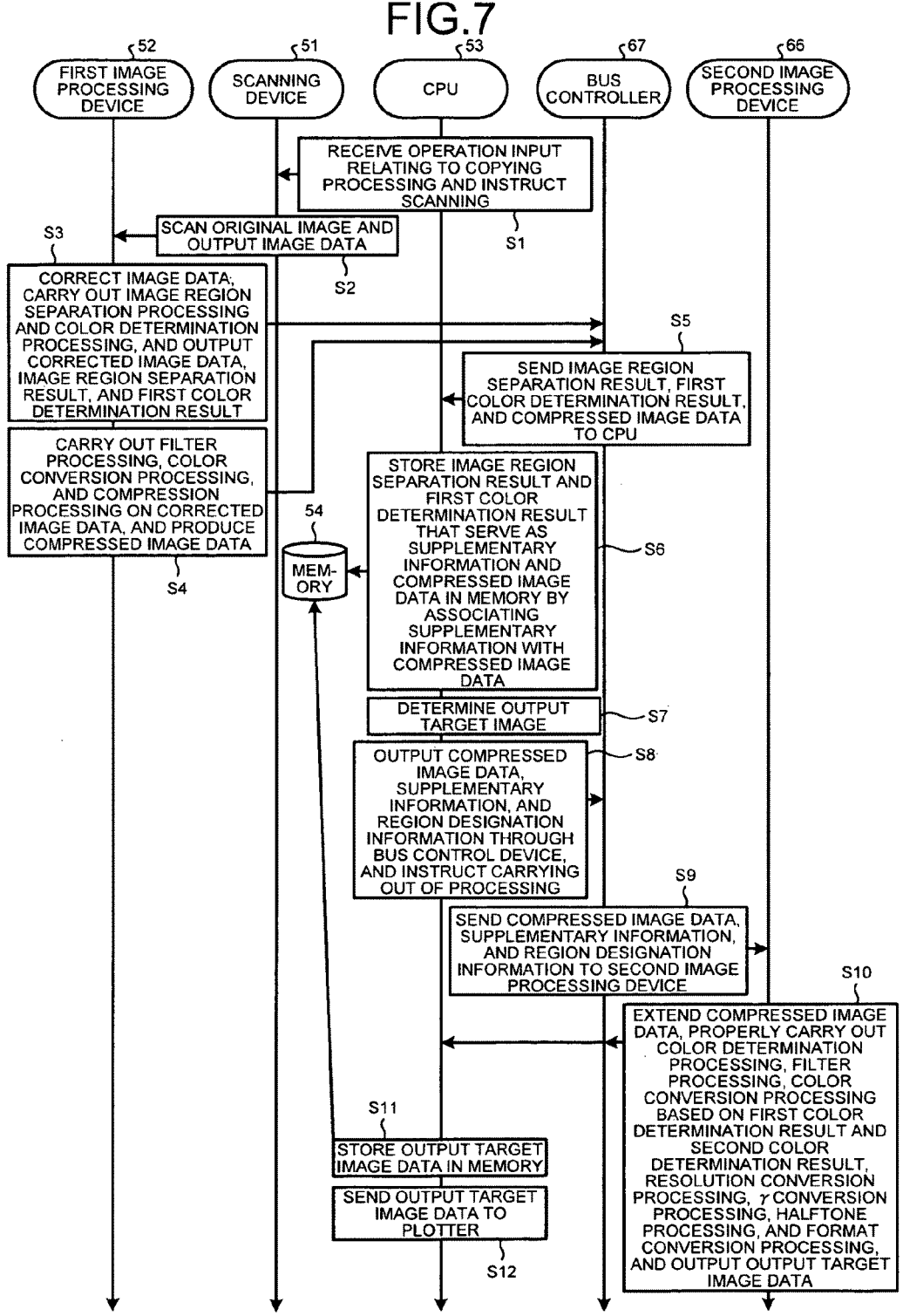
FIG. 7 is a flowchart illustrating a procedure of copying processing carried out by an image forming apparatus 50 according to the first embodiment.

A procedure for copying processing carried out by the image forming apparatus 50 according to the embodiment is described below with reference to FIG. 7. A user sets an original manuscript to the scanning device 51, and carries out operation input that relates to copying setting and instructs a start of copying with the operation display device 57. In the copying setting, instructions can be carried out that designate, a magnification ratio, an output size, and an image quality mode, for example. As described above, the image forming apparatus 50 carries out image editing processing so as to enhance the levels of sharpness processing and smoothing processing according to the designations of the image quality mode, and enhancement and smoothness levels. In addition, various image editing processing so as to increase chroma or changing colors of an output target image are carried out when needed. When a user wants to carry out the various image editing processing, the user carries out operation input that instructs execution of desired image editing processing with the operation display device 57. A variety of images are obtained by carrying out the image editing processing because a user's demand includes not only to obtain an output target image that is exactly the same as an image in an original manuscript, but also to obtain an output target image in which characters look clearer than those of the image in the original manuscript and to obtain an output target image in which an image looks brighter than the image in the original manuscript by changing the colors of the image in the original manuscript. In the copying setting, it is also allowed to carry out operation input to set the ACS mode that automatically determines whether an output target image is a chromatic image or an achromatic image.

The operation display device 57, according to operation input by a user, produces control commands that instruct setting for copying and a start for copying, for example, and outputs the control commands to the CPU 53 through the universal standard I/F 78. The CPU 53 receives the control commands produced according to the operation input, and reads out various programs from the ROM 61 so as to execute the programs. The CPU 53 sequentially carries out setting and processing necessary for copying according to the control commands. First, the CPU 53 instructs the scanning device 51 to scan an image in an original manuscript (step S1). The scanning device 51 scans the image in the original manuscript according to the instruction, produces image data that is in the RGB format to depict the image in the original manuscript, and outputs the image data (step S2). The output image data is input to the γ conversion section 102, the image region separation section 101, and the first color determination section 100 of the first image processing device 52. The γ conversion section 102 corrects the input image data as described above, and outputs the image data after the correction. The image region separation section 101 identifies a line drawing region in the image in the original manuscript depicted by the image data input from the scanning device 51, determines whether each pixel belongs to a character region, a chromatic region, or an achromatic region based on a ratio of the line drawing region to a scanned region in a single scanning process, and outputs a determination result as an image region separation result, as described above. The first color determination section 100 determines whether the image in the original manuscript depicted by the input image data in the RGB format is a chromatic image or an achromatic image, and outputs a determination result (the first color determination result) (step S3).

As described above, the filtering section 103 carries out filtering processing on the image data in the RGB format to be output from the γ conversion section 102, and outputs the image data after the processing. The color conversion section 104 carries out color conversion on the image data to be output from the filtering section 103, and outputs the image data after the color conversion. The image compression section 105 carries out compression processing on the image data in the RGB format to be output from the color conversion section 104 after the color conversion so as to produce compressed image data (step S4).

The bus controller 67 sends the compressed image data to be output from the first image processing device 52, and the image region separation result and the first color determination result that serve as the supplementary information of the compressed image data to the CPU 53 (step S5). The CPU 53 stores the compressed image data, and the image region separation result and the first color determination result that serve as supplementary information in the memory 54 by associating the compressed image data with the supplementary information (step S6). The CPU 53 determines an image corresponding to an output target region (output target image) according to operation input that designates a magnification ratio or an output size in the image in the original manuscript depicted by the compressed image data (step S7).

The CPU 53 reads the compressed image data and the supplementary information of the compressed image data from the memory 54, and sends them to the bus controller 67 so as to initiate processing at the second image processing device 66 (step S8). The bus controller 67 outputs the image data to the second image processing device 66. The CPU 53 outputs information for region designation to designate a region corresponding to an output target image to the second image processing device 66 through the bus controller 67. In this way, the CPU 53 switches image data processing to the second image processing device 66. When operation input is carried out either to designate an output size or to designate an image mode, or both, the CPU 53 sends setting designation information that designates the input setting to the bus controller 67. The bus controller 67 outputs the setting designation information to the second image processing device 66 (step S9).

The image extension section 110 of the second image processing device 66, when receiving the compressed image data through the CPU 53 and the bus controller 67, extends the compressed image data and outputs the resulting data. The second color determination section 117 carries out color determination processing for determining whether an output target image corresponding to a region designated by the region designation information in an image represented with the image data in the RGB format to be output from the image extension section 110 is a chromatic image or an achromatic image, and output a result (the second color determination result). The filtering section 111 carries out filtering processing on the output target image corresponding to the region designated with the region designation information in the image data to be output from the image extension section 110 based on the image region separation result included in the supplementary information and the setting designation information, and outputs the output target image data after the processing. Specifically, the filtering section 111 enhances the level of sharpness processing on the output target image when the image quality mode is set to the character mode in the setting designation information. The filtering section 111 enhances the level of smoothing processing on the output target image when the image quality mode is set to the photographic mode in the setting designation information.

The color conversion section 112 determines a final color determination result on the output target image, with 8 bits for each of the R, G, and B primaries, to be output from the filtering section 111 based on at least result between the first color determination result included in the supplementary information and the second color determination result to be output from the second color determination section 117, and carries out color conversion according to a color space of the plotter 56 based on the final color determination result. Specifically, the color conversion section 112 color-converts the output target image data with 8 bits for each of the R, G, and B primaries into the output target image data in the CMYK format with 8 bits for each of the C, M, Y, and K primaries when the output target image is determined as a chromatic image in the final color determination result as a result of a logical AND between the first color determination result and the second color determination result, as described above. On the other hand, when the final color determination result is obtained to determine the output target image as an achromatic image, the color conversion section 112 color-converts the output target image data with 8 bits for each of the R, G, and B primaries into 8-bit image data in K format.

The resolution conversion section 113 carries out magnification change processing on the output target image data to be output from the color conversion section 112 according to a magnification ratio when the magnification ratio is different from 100%, and outputs the output target image data after the conversion to the γ conversion section 114. The γ conversion section 114 converts a gradation level characteristic of the image according to a characteristic of an output destination to which the image is output, and outputs the output target image data after the conversion. The halftone processing section 115 carries out gradation level conversion processing on the output target image data to be output from the resolution conversion section 113 depending on whether the output target image is a binary image or a multi-level image, and outputs the output target image data obtained from the processing carried out. The format conversion section 116 outputs the output target image data to be output from the halftone processing section 115 without processing the output target image data because the output application of the output target image is to output an output target image data on a transfer sheet (step S10). The CPU 53 receives the output target image data to be output from the format conversion section 116 through the bus controller 67, and stores the output target image data in the memory 54 (step S11). Then, the CPU 53 reads the output target image data from the memory 54, and sends the output target image data to the plotter 56 through the plotter I/F device 55 (step S12). The plotter 56 receives the output target image data, forms an output target image depicted by the output target image data according to whether a color space of the output target image data is in the CMYK format or in the K format, and outputs the output target image on a transfer sheet. As a result, the output target image is copied on the transfer sheet.

For example, when the magnification ratio is 200%, the output target image is output as an achromatic image as illustrated in FIG. 5 irrespective of the second color determination result because it is determined that the image in the original manuscript is an achromatic image by the first color determination result. When the magnification ratio is 100%, i.e., copying at unity magnification is carried out, the output target image is output as a chromatic image because it is determined that the output target image is a chromatic image by the second color determination result although it is determined that the image in the original manuscript is a chromatic image by the first color determination result.

Scanner Delivery Processing

Figure 8:
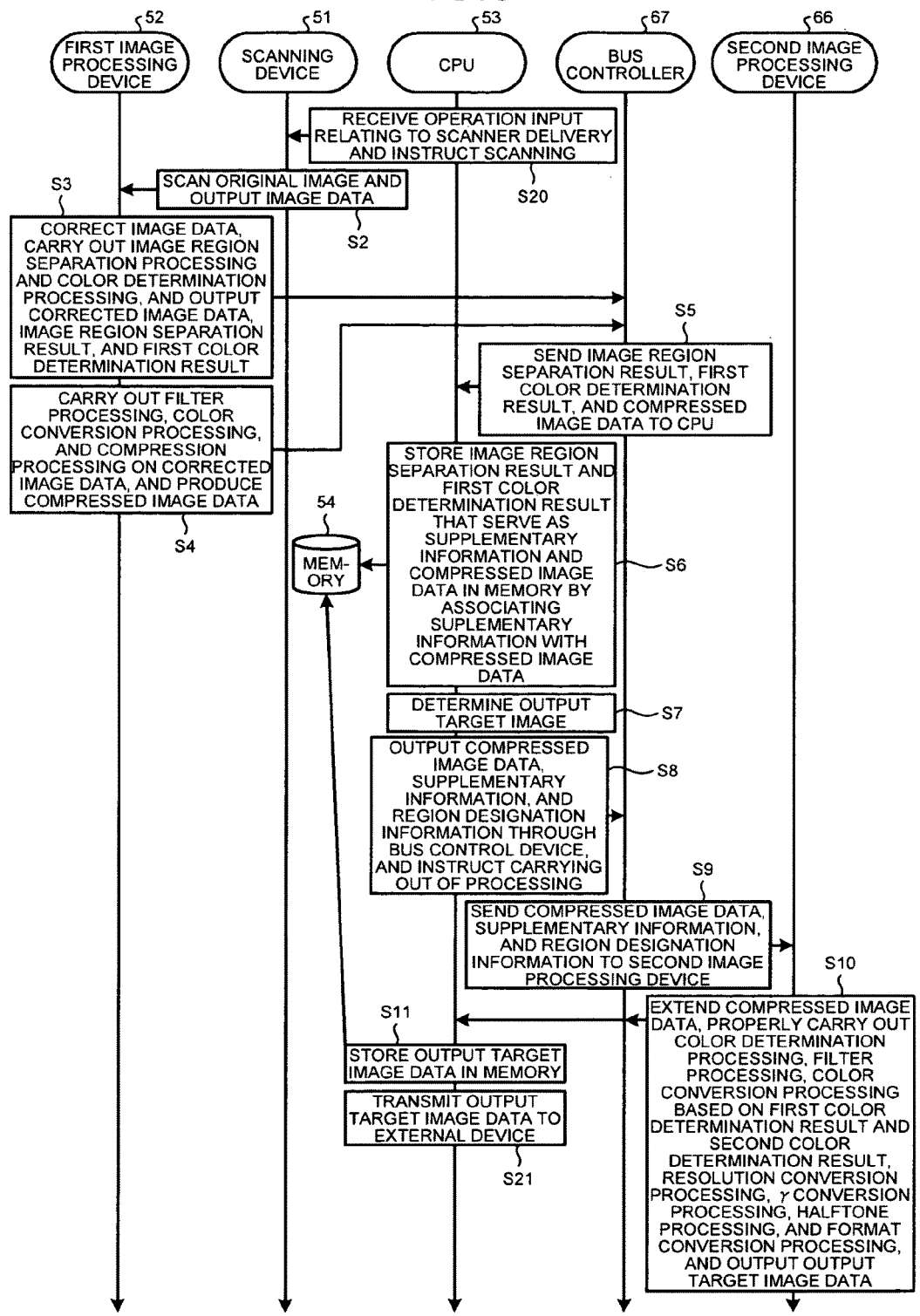
FIG. 8 is a flowchart illustrating a procedure of scanner delivery processing carried out by the image forming apparatus 50 according to the first embodiment.

A procedure for scanner delivery processing carried out by the image forming apparatus 50 is described below with reference to FIG. 8. A user sets an original manuscript to the scanning device 51, and carries out operation input that relates to scanner delivery setting and instructs a start of scanner delivery with the operation display device 57. In the scanner delivery setting, instructions are set that designate a delivery target external device (the PC 63, herein), a resolution of a delivery target image, and a scanning area, for example. In the scanner delivery setting, operation input to set the ACS mode is also carried out. In addition, operation input to instruct execution of various image editing processing can be properly carried out. The operation display device 57, according to operation input by a user, produces control commands that instruct setting of scanner delivery and a start of scanner delivery, for example, and outputs the control commands to the CPU 53 through the universal standard I/F 78. The CPU 53 receives the control commands produced according to the operation input, and reads out various programs from the ROM 61 so as to execute the programs. The CPU 53 sequentially carries out setting and processing necessary for scanner delivery according to the control commands. First, the CPU 53 instructs the scanning device 51 to scan images in an original manuscript (step S20). The scanning device 51 scans the images in the original manuscript according to the instruction, produces image data that is in the RGB format and depicts the image in the original manuscript, and outputs the image data (step S2). The output image data is input to the γ conversion section 102, the image region separation section 101, and the first color determination section 100 of the first image processing device 52. As described in the copying processing, the image data is processed at each section (step S3 and step S4). The compressed image data, the image region separation result, and the first color determination result are input to the CPU 53 through the bus controller 67. Step from S5 to S7 are the same as those in the copying processing.

At step S7, the CPU 53 determines an output target image from an image in an original manuscript depicted by the compressed image data according to operation input that designates a resolution of a delivery target image and a scanning area. If the resolution of the delivery target image and the scanning area are not designated, the output target image corresponds to the whole image in the original manuscript. The CPU 53 carries out processing at step S8 and step S9 in the same manner as described above.

At step S10, the image extension section 110 of the second image processing device 66 receives the compressed image data through the CPU 53 and the bus controller 67, extends the compressed image data, and outputs the resulting data. The second color determination section 117 carries out color determination processing for determining whether an output target image corresponding to a region designated by the region designation information in an image represented with the image data in the RGB format to be output from the image extension section 110 is a chromatic image or an achromatic image, and output a result (the second color determination result). The filtering section 111 carries out filtering processing on the output target image corresponding to the region designated by the region designation information in relation to the image data in the RGB format to be output from the image extension section 110, and outputs the output target image data after the processing. The color conversion section 112 determines a final color determination result of the output target image data with 8 bits for each of the R, G, and B primaries to be output from the filtering section 111 based on at least one result between the first color determination result included in the supplementary information and the second color determination result to be output from the second color determination section 117, and carries out color conversion according to a color space of the PC 63 serving as the delivery target external device based on the final color determination result. Specifically, the color conversion section 112 color-converts the output target image data with 8 bits for each of the R, G, and B primaries into the output target image data of a multi-level RGB format when the final color determination result is obtained that the output target image is a chromatic image as a result of logical AND between the first color determination result and the second color determination result, as described above. On the other hand, when the final color determination result is obtained to determine the output target image as an achromatic image, the color conversion section 112 color-converts the output target image data with 8 bits for each of the R, G, and B primaries into a multi-level grayscale image data or binary monochromatic image data.

The resolution conversion section 113 outputs the output target image data to be output from the color conversion section 112 to the γ conversion section 114. The γ conversion section 114 converts a gradation characteristic of the image according to a characteristic of an output destination to which the image is output, and outputs the output target image data after the conversion. The halftone processing section 115 carries out gradation level conversion on the output target image data to be output from the resolution conversion section 113 depending on whether the output target image is a binary image or a multi-level image, and outputs the output target image data obtained from the processing carried out. The format conversion section 116 carries out format conversion on the output target image data to be output from the halftone processing section 115 because the output application of the output target image is the scanner delivery, and outputs the output target image after the conversion. For example, the format conversion section 116 carries out JPEG compression on the output target image data when it is determined that the output target image is a chromatic image by the first color determination result or the second color determination result that is adopted based on a reliability determination result sent from the CPU 53, and outputs the output target image data after the compression. The format conversion section 116 carries out MMR compression on the output target image data so as to produce the output target image data in a TIFF file format, and outputs the output target image data after the compression when the output target image data is color-converted into binary monochromatic image data based on the final color determination result that the output target image is an achromatic image. The format conversion section 116 carries out JPEG compression on the output target image data, and outputs the output target image data after the compression when the output target image data is color-converted into grayscale image data based on the final color determination result that determines the output target image as an achromatic image. The CPU 53 receives the output target image data to be output from the format conversion section 116 through the bus controller 67, and stores the output target image data in the memory 54 (step S11). Then, the CPU 53 reads the output target image data from the memory 54, and sends the output target image data to the PC 63 serving as the external device through the external I/F device 59 (step S21).

In this way, conversion of the output target image data into different formats according to whether the output target image is a chromatic image or an achromatic image enables the output target image data to have an appropriate data size. Thus, it is possible to avoid a transmission of an output target image data with an unnecessary large data size to the PC 63. As a result, costs and time spent by a user, an image data capacity, and the storage capacity of the PC 63 can be reduced.

Image Storage Processing

Figure 9:
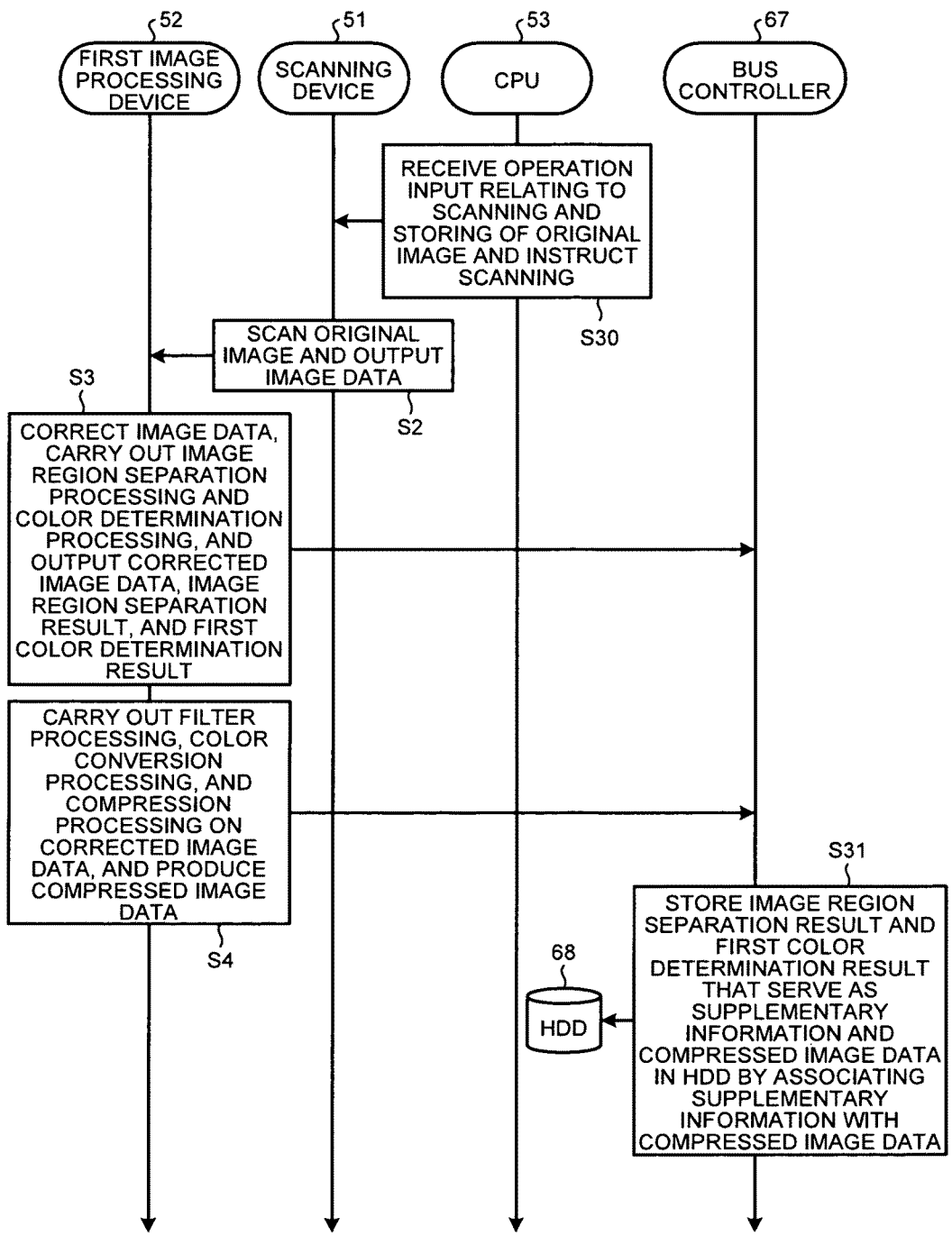
FIG. 9 is a flowchart illustrating a procedure when the image forming apparatus 50 according to the first embodiment carries out image storage processing only without carrying out the copying processing or the scanner delivery processing.

A procedure is described below with reference to FIG. 9 for the image forming apparatus 50 when the image forming apparatus 50 carries out image storage processing only without carrying out the copying processing or the scanner delivery processing. A user sets an original manuscript to the scanning device 51, and carries out operation input that relates to a desired image quality mode setting and instructs a start of scanning and storing an image in an original manuscript with the operation display device 57. In addition, operation input to instruct execution of various image editing processing can be adequately carried out. This is because some users may feel cumbersome to carry out image editing processing for every image output at a later stage, and instead, may want to carry out image editing processing even when the image storage processing alone is carried out. In the embodiment, an image in an original manuscript is scanned with a most general condition so that a stored image can be reused for various purposes. That is, the scanning magnification ratio of an image in an original manuscript is set at unity. The operation display device 57, according to operation input by a user, produces control commands that instruct setting of an image quality mode and a start of scanning of an image in an original manuscript, for example, and outputs the control commands to the CPU 53 through the universal standard I/F 78. The CPU 53 receives the control commands produced according to the operation input, and reads out various programs from the ROM 61 so as to execute the programs. The CPU 53 sequentially carries out setting and processing necessary for scanning the image in the original manuscript according to the control commands (step S30). Procedures from step S2 to step S4 are the same as those in the scanner delivery processing. At step S31, the bus controller 67 stores, in the HDD 68, the compressed image data, and the image region separation result and the first color determination result that are output from the first image processing device 52 and serve as the supplementary information of the compressed image data by associating the supplementary information with the compressed image data.

Copying Processing and Image Storage Processing

Figure 10:
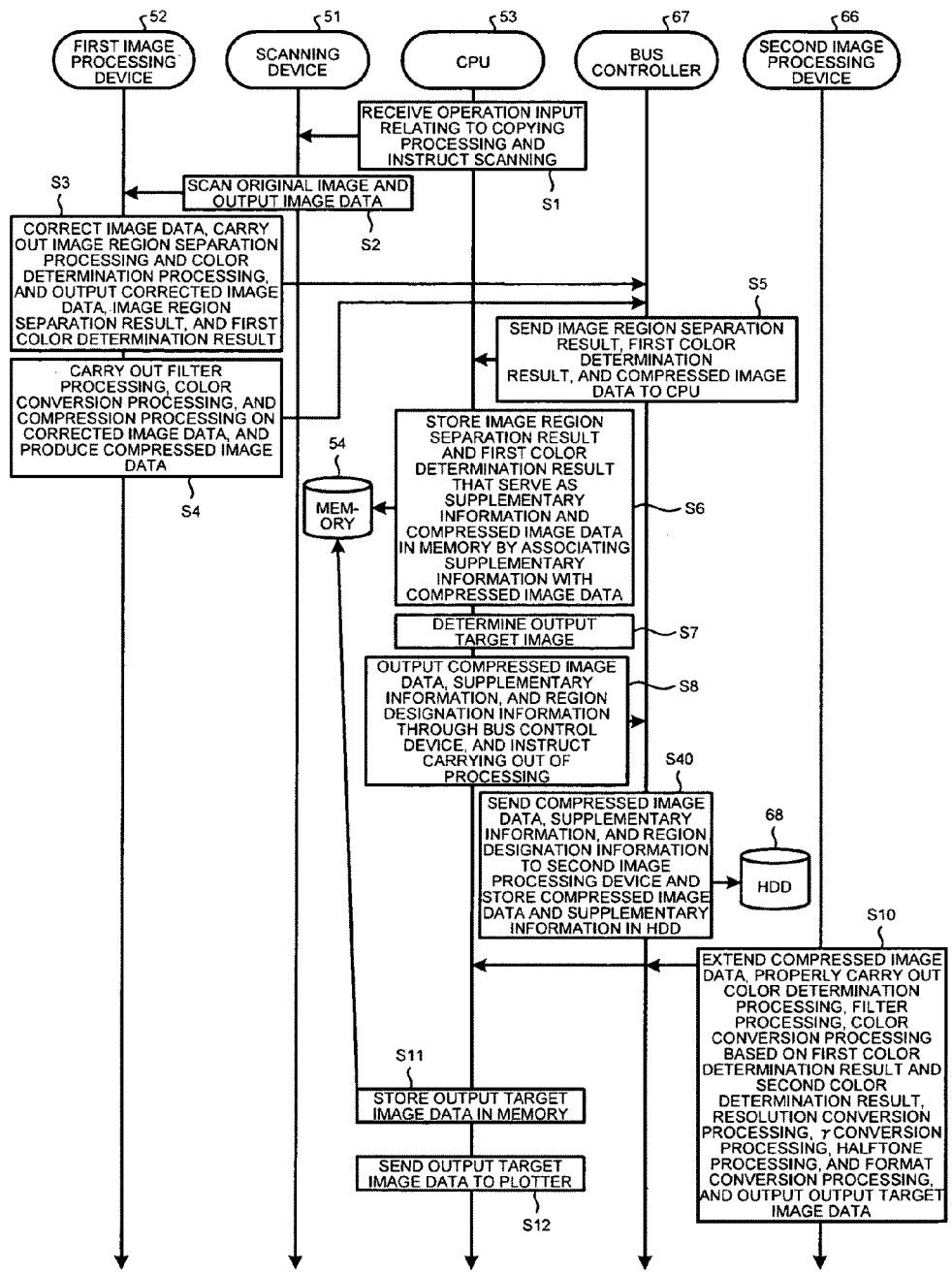
FIG. 10 is a flowchart illustrating a procedure when the image forming apparatus 50 according to the first embodiment simultaneously carries out the copying processing and the image storage processing.

A procedure when the image forming apparatus 50 simultaneously carries out the copying processing and the image storage processing is described below with reference FIG. 10. Procedures from step S1 to step S8 are the same as those in the above-described copying processing. At step S40 after step S8, the bus controller 67 transmits the image region separation result, the first color determination result, and the compressed image data that are output from the first image processing device 52 to the second image processing device 66. At step S40, the bus controller 67 stores the compressed image data and the image region separation result and the first color determination result that serve as the supplementary information to the compressed image data in the HDD 68. Processing from step S10 to those that follow is the same as that of the copying processing. As described above, the image forming apparatus 50 can simultaneously carry out the copying processing and the image storage processing.

Scanner Delivery Processing and Image Storage Processing

Figure 11:
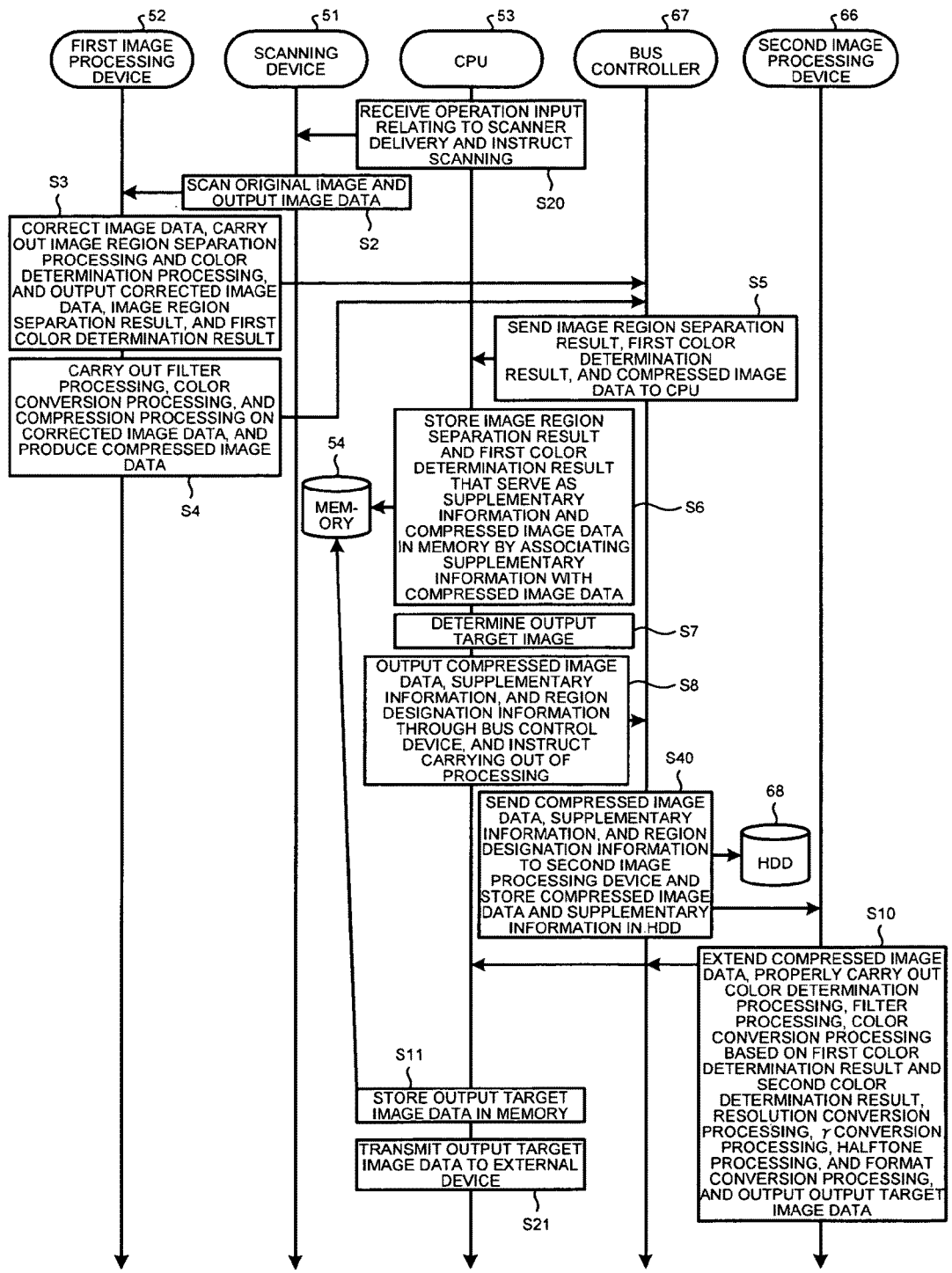
FIG. 11 is a flowchart illustrating a procedure when the image forming apparatus 50 according to the first embodiment simultaneously carries out the scanner delivery processing and the image storage processing.

A procedure when the image forming apparatus 50, simultaneously carries out the scanner delivery processing and the image storage processing is described below with reference to FIG. 11. Processing at step S20 and from step S2 to step S8 is the same as that of the scanner delivery processing. Processing at step S40 is the same as that of the case where the copying processing and the image storage processing are simultaneously carried out. Processing from step S10 to those that follow is the same as that of the scanner delivery processing. As described above, the image forming apparatus 50 can simultaneously carry out the scanner delivery processing and the image storage processing.

Reuse of a Stored Image

An outline of processing when the image-forming apparatus 50 reuses image data stored in the HDD 68 is described below. As described above, an image data is stored in the HDD 68 by being associated with supplementary information. The stored image data can be reused even if time has elapsed since when the image in the original manuscript was stored. The CPU 53 of the image forming apparatus 50 causes the operation display device 57 to display a display screen serving as a user interface when image data is reused. For example, the CPU 53 causes the operation display device 57 to display a display screen that represents the following exemplary items according to user's operation: data names, created date and time, updated date and time of image data stored in the HDD 68 as of a date when the user's operation is carried out, and thumbnail images showing reduced images depicted by image data. A user can confirm images stored in the HDD 68 by browsing the display screen displayed on the operation display device 57. A user carries out operation input to select desired image data for reuse on the display screen and also carries out operation input that instructs a start of reuse processing on the selected image data and relates to reuse processing setting and a desired image quality mode with the operation display device 57. Examples of reuse processing include image output processing on a transfer sheet and the scanner delivery processing. In addition to the above examples, any other processing such as FAX transmission may be included. The description thereof is omitted herein.

Figure 12:
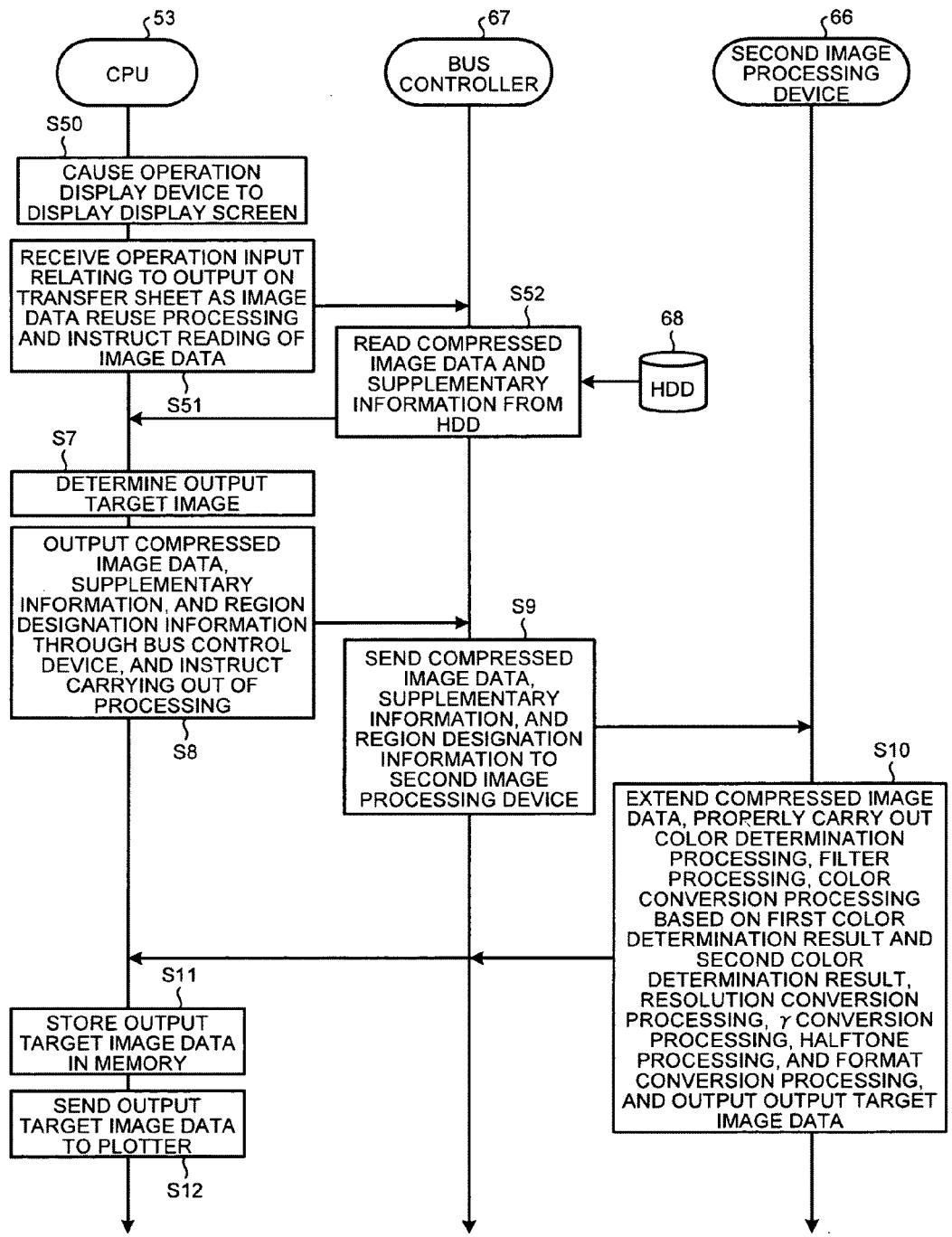
FIG. 12 is a flowchart illustrating a procedure when the image forming apparatus 50 according to the first embodiment carries out image output processing on a transfer sheet as reuse processing.

A procedure when the image forming apparatus 50 carries out image output processing on a transfer sheet as reuse processing is described below with reference to FIG. 12. The CPU 53 of the image forming apparatus 50 causes the operation display device 57 to display a display screen serving as a user interface when image data is reused (step S50). A user carries out operation input relating to output setting on a transfer sheet as reuse processing on the display screen, and carries out operation input that instructs a start of output to the transfer sheet with the operation display device 57. The image output processing on a transfer sheet is nearly the same as the copying processing. In the output setting on a transfer sheet, instructions can be carried out to designate a magnification ratio, an output size, and an image quality mode, for example, in the same manner as described in the copying processing. In the output setting on a transfer sheet, the ACS mode is set. The operation display device 57, according to the operation input by a user, produces control commands that instruct setting of output on a transfer sheet and a start of output on the transfer sheet, for example, and outputs the control commands to the CPU 53 through the universal standard I/F 78. The CPU 53 receives the control commands produced according to the operation input, and reads out various programs from the ROM 61 so as to execute the programs. The CPU 53 sequentially carries out setting and processing necessary for output on a transfer sheet according to the control commands. The CPU 53 instructs the bus controller 67 to read specific image data (step S51). The bus controller 67 reads the specific image data and the supplementary information from the HDD 68 according to the instruction, and sends the data and the information to the CPU 53 (step S52). At step S7, because the ACS mode is set, the CPU 53 determines an output target image using the specific image data, the supplementary information, and a magnification ratio in the same manner as the copying processing. Step from S8 to S12 are the same as those in the copying processing.

Figure 13:
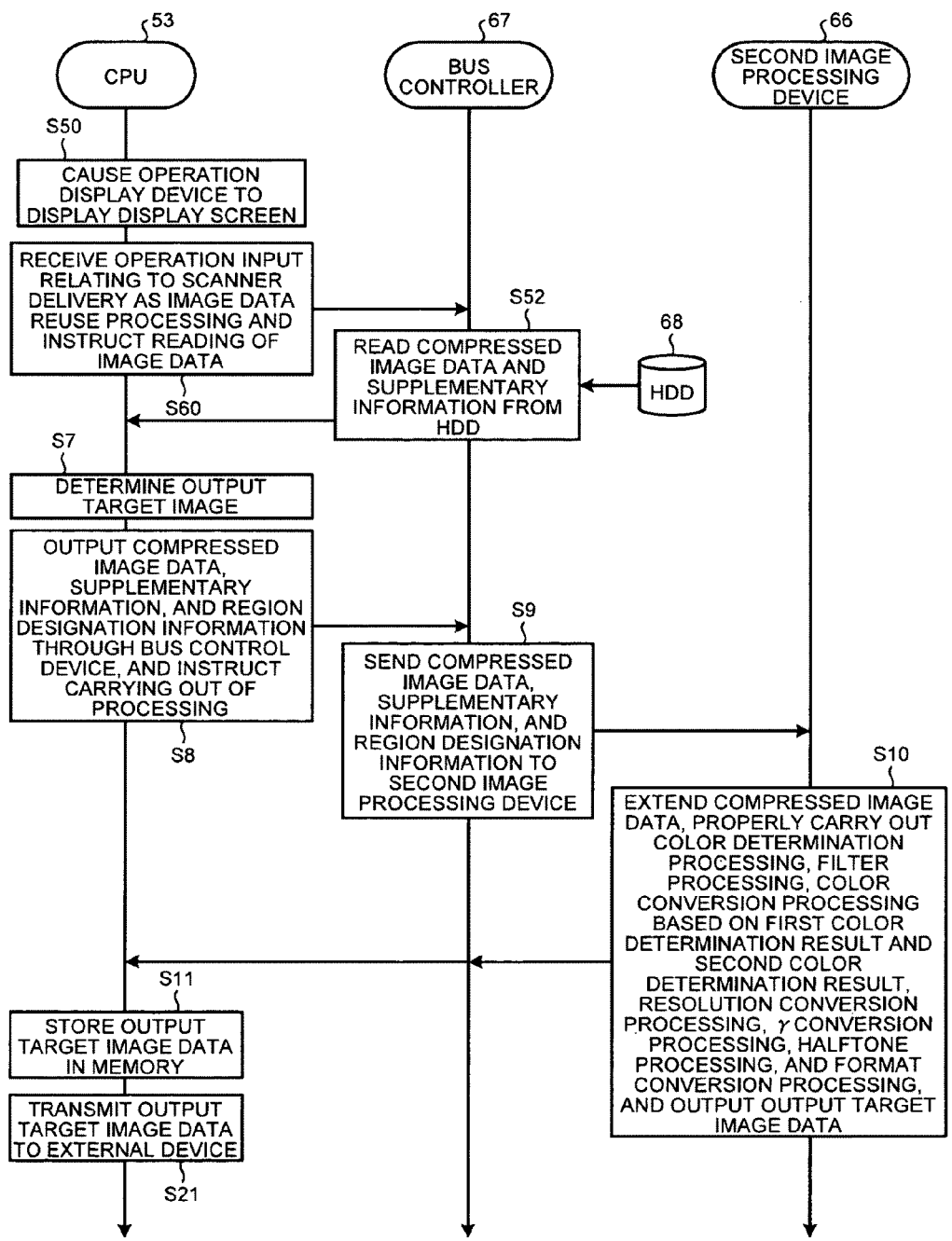
FIG. 13 is a flowchart illustrating a procedure when the image forming apparatus 50 according to the first embodiment carries out the scanner delivery processing as reuse processing.

A procedure when the image forming apparatus 50 carries out the scanner delivery processing as reuse processing is described below with reference to FIG. 13. The CPU 53 of the image forming apparatus 50 causes the operation display device 57 to display a display screen serving as a user interface when image data is reused (step S50). A user carries out operation input that instructs a start of scanner delivery as reuse processing on the display screen, for example, and carries out operation input to set a desired image quality mode, for example, with the operation display device 57. In the scanner delivery setting, instructions are set that designate a delivery target external device (the PC 63, herein), a resolution of a delivery target image, and a scanning area, for example, as described in the scanner delivery processing. The operation display device 57, according to the operation input by a user, produces control commands that instruct setting of scanner delivery and a start of scanner delivery, for example, and outputs the control commands to the CPU 53 through the universal standard I/F 78. The CPU 53 receives the control commands produced according to the operation input, and reads out various programs from the ROM 61 so as to execute the programs. The CPU 53 sequentially carries out setting and processing necessary for scanner delivery processing according to the control commands. The CPU 53 instructs the bus controller 67 to read specific image data (step S60). The bus controller 67 reads the specific image data and the supplementary information from the HDD 68 according to the instruction, and sends the data and the information to the CPU 53 (step S52). At step S7, because the ACS mode is set, the CPU 53 determines an output target image according to a resolution of a delivery target image and a scanning area, as described in the scanner delivery processing.

As an example, suppose an image in an original manuscript of A3 size is copied onto a transfer sheet of A3 size by the copying processing and the image in the original manuscript data is stored in the HDD 68 by the image storage processing, and the stored image data is subjected to the scanner delivery processing. In the scanner delivery processing, suppose a resolution is designated to 600 dpi and a scanning area is designated to A4 lateral. In this case, the image surrounded with the solid line in FIG. 5 is the output target image in relation to the image in the original manuscript illustrated in FIG. 3, for example. In the example, the color determination result is that the output target image is an achromatic image. Processing from step S8 to those that follow are the same as that of the scanner delivery processing.

In this way, the first image processing device 52 standardizes the characteristic of image data input from the scanning device 51 so that the image data can be used by an output destination such as the plotter 56 and the PC 63 serving as the external device, and stores the image data whose characteristic has been standardized in the HDD 68. The first image processing device 52 carries out image region separation processing and color determination processing on the image data input from the scanning device 51, and stores the image region separation result and the color determination result that serve as supplementary information and the image data after the processing together in the HDD 68. When a user reuses image data stored in the HDD 68 of the image forming apparatus 50, the second image processing device 66 processes the image data to image data suitable for the output destination such as the plotter 56 and the PC 63.

Figure 14:
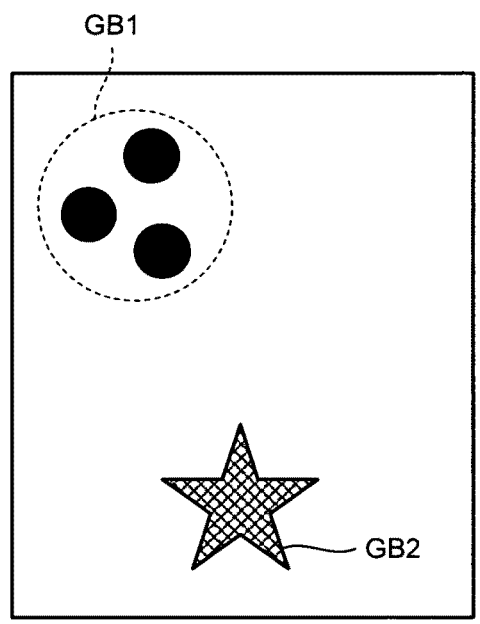
FIG. 14 is a schematic exemplarily illustrating an image when the image in the original manuscript exemplarily illustrated in FIG. 3 is output with a magnification ratio of 100%.
Figure 15:
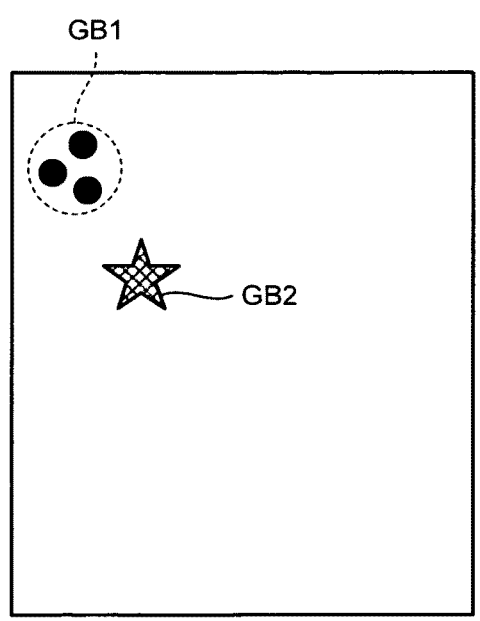
FIG. 15 is a schematic exemplarily illustrating an image when the image in the original manuscript exemplarily illustrated in FIG. 3 is output with a magnification ratio of 50%.

Specifically, an example is described in which the image in the original manuscript exemplarily illustrated in FIG. 3 is output on a transfer sheet. FIG. 14 is a schematic exemplarily illustrating an image when the image in the original manuscript is output with a magnification ratio of 100% (unity magnification). FIG. 15 is a schematic exemplarily illustrating an image when the image in the original manuscript is output with a magnification ratio of 50% (reduction). In this regard, FIG. 5 is a schematic exemplarily illustrating an image when the image in the original manuscript is output with a magnification ratio of 200% (enlargement). In the example of FIG. 3, the image in the original manuscript is a chromatic image including a chromatic image and an achromatic image because the image area GB1 is an achromatic image and image GB2 is an achromatic image, as described above. Accordingly, in the examples of FIGS. 14 and 15, an output target image is a chromatic image including a chromatic image and an achromatic image in the same manner as the image in the original manuscript is because the output target image corresponds to an image including all the images in the original manuscript. On the other hand, as illustrated in FIG. 5, when an image including only the image area GB1 is output as a part of the image in the original manuscript, the output target image is an achromatic image because a region of a chromatic image is not included. Even when copying is carried out with a magnification ratio of 100% (unity magnification), an output target image is a part of the image in the original manuscript in the same manner as the image exemplary illustrated in FIG. 5 if the image in the original manuscript is output on a transfer sheet having a size smaller than the size of the image in the original manuscript (e.g., an original manuscript of an A3 size is output on a transfer sheet of an A5 size). When an output target image is a part of an image in an original manuscript and the sizes of the image in the original manuscript and the output target images are different from each other, as the case described above, the first color determination result determined at scanning the image in the original manuscript and the second color determination result on the actual output target image may differ from each other. In such a case, in the example of FIG. 5, the output target image is output by using four colors in the CMYK format through the output target image is an achromatic image when the output target image having been color-converted by using the first color determination is output. As a result, processing costs and time are wasted. In this case, the output image may have different colors from the colors in an actual output target image to dissatisfy a user's need. In the embodiment, however, output target image is color-converted by using the color determination result carried out by the second color determination section 117 of the second image processing device 66. Accordingly, the output target image that is actually output can be properly color-converted. As a result, processing costs and time can be reduced while reliability of color determination processing is maintained. When an image in an original manuscript is subjected to image editing processing such as sharpness processing and smoothing processing, the accuracy of color determination processing carried out by the second color determination section 117 may be deteriorated. To address this problem, when the first color determination section 100 of the first image processing device 52 determines that the image in the original manuscript is an achromatic image, the second image processing device 66 determines a final color determination result to determine the output target image as an achromatic image irrespective of the color determination result of the second color determination section 117, and carries out color-conversion. The structure can maintain color determination processing accuracy, and reduce costs and time spent by a user, and a storage capacity used for storing image data and supplementary information.

Second Embodiment

A second embodiment of the image forming apparatus is described below. The same elements as those in the first embodiment are labeled with the same numerals, and description thereof is omitted.

In the first embodiment, sharpness processing and smoothing processing are mainly described as image editing processing. In the second embodiment, the following description is made when color processing for increasing chromatic pixels of an image in an original manuscript is carried out by a user's intention. The color processing includes color conversion processing in which hues of an image in an original manuscript are identified so that a pixel having a achromatic color is converted into the pixel having a chromatic color, and under-color processing in which a color is added to a ground of an image in an original manuscript. The color conversion processing is described below. In the embodiment, any of eight hues, i.e., red (R), green (G), blue (B), cyan (C), magenta (M), yellow (Y), white (Wh), and black (Bk), can be converted. The image forming apparatus 50 carries out the color conversion processing according to operation output that is carried by a user with the operation display device 57 so as to designate a original color and a destination color and instruct execution of color conversion processing. The color conversion processing can convert an achromatic pixel appearing in an image in an original manuscript into a chromatic pixel, for example. The achromatic pixel is a pixel having a color of black (black pixel), for example. The chromatic pixel is a pixel having a color of red (red pixel), for example. Such color conversion processing is carried out by the color conversion section 104 of the first image processing device 52. The method of color conversion processing is not described in detail because the method is a known technique. In general, the color conversion is carried out based on the following classifications: a pixel having lower density than a specific density is classified as a white hue; a pixel having a lower RGB difference than a specific value is classified as a black pixel; and the other pixels are classified into any hue of RGBCMY by a known hue segmentation processing. When a black pixel is converted into a red pixel, both a G component and a B component are deleted from a pixel value of the conversion target black pixel in the RGB space while a C component is deleted from the pixel value of the conversion target black pixel in a CMY space.

The under color processing is described below. In the under color processing, a user's favorite color, which is chosen from red (R), green (G), blue (B), cyan (C), magenta (M), and yellow (Y), is added to the whole area of an image in an original manuscript as a ground. The image forming apparatus 50 carries out the under-color processing according to operation input that is carried out by a user with the operation display device 57 so as to designate a color that the user wants to add as an under color and instruct execution for under-color processing. Such under-color processing is carried out by the color conversion section 104 of the first image processing device 52. The color conversion section 104 carries out normal color conversion processing on an image in an original manuscript, and thereafter carries out under color processing by combining an image of a color designated by a user as an under color and the image after the color conversion processing. The color conversion sections 104 and 112 carry out under-color processing so as not to exceed a maximum acceptable value for a total toner amount because if toner is excessively stuck to a transfer sheet when an image is output on the transfer sheet, a fixing failure occurs.

It is conceivable that such color processing is required when a user wants to output an image in an original manuscript as a chromatic image. Thus, it is inappropriate that an output target image is output as an achromatic image in the ACS mode even if the image in the original manuscript scanned from the original is an achromatic image. Taking such cases into consideration, color conversion is carried out on an output target image as follows. Information that the first image processing device 52 has carried out color processing is stored in the memory 54 or the HDD 68 as supplementary information together with the image region separation result and the first color determination result by being associated with the image data after the processing. In reuse of the image data when the ACS mode is set, the color conversion section 112 determines a final determination result that an output target image is a chromatic image and carries out color conversion on the output target image when the supplementary information indicates that the color processing has been carried out even if the first color determination result serving as the supplementary information corresponding to the image data shows that an image in an original manuscript is an achromatic image.

In addition, in reuse of image data when the ACS mode is set and information indicating the level of color processing is stored in the memory 54 or the HDD 68 as supplementary information by being associated with the image data, color conversion may be carried out on an output target as follows. The color conversion section 112 determines a final determination result that an output target image is a chromatic image when the supplementary information indicates that the color processing has been carried out and the level of the color processing is equal to or larger than a predetermined level even if the first color determination result serving as the supplementary information corresponding to the image data shows that an image in an original manuscript is an achromatic image. The color conversion section 112 carries out color conversion according to the final determination result. On the other hand, when the supplementary information shows that the color processing has been carried out and the level of the color processing is smaller than the predetermined level, the color conversion section 112 determines that the second color determination result is a final determination result, and carries out color conversion based on the final determination result.

With above-described structure, accuracy of color determination processing can be maintained in the ACS mode with a user's intention.

Third Embodiment

A third embodiment of the image forming apparatus is described below. The same elements as the first and the second embodiments are labeled with the same numerals, and description thereof is omitted.

In the third embodiment, an image forming apparatus includes a first color determination section that carries out color determination processing on an image in an original manuscript in the same manner as the first and the second embodiments. The image forming apparatus of the third embodiment, however, does not include a second color determination section that carries out color determination on an output target image. The color determination processing on the output target image is carried out by another image forming apparatus.

Figure 16:
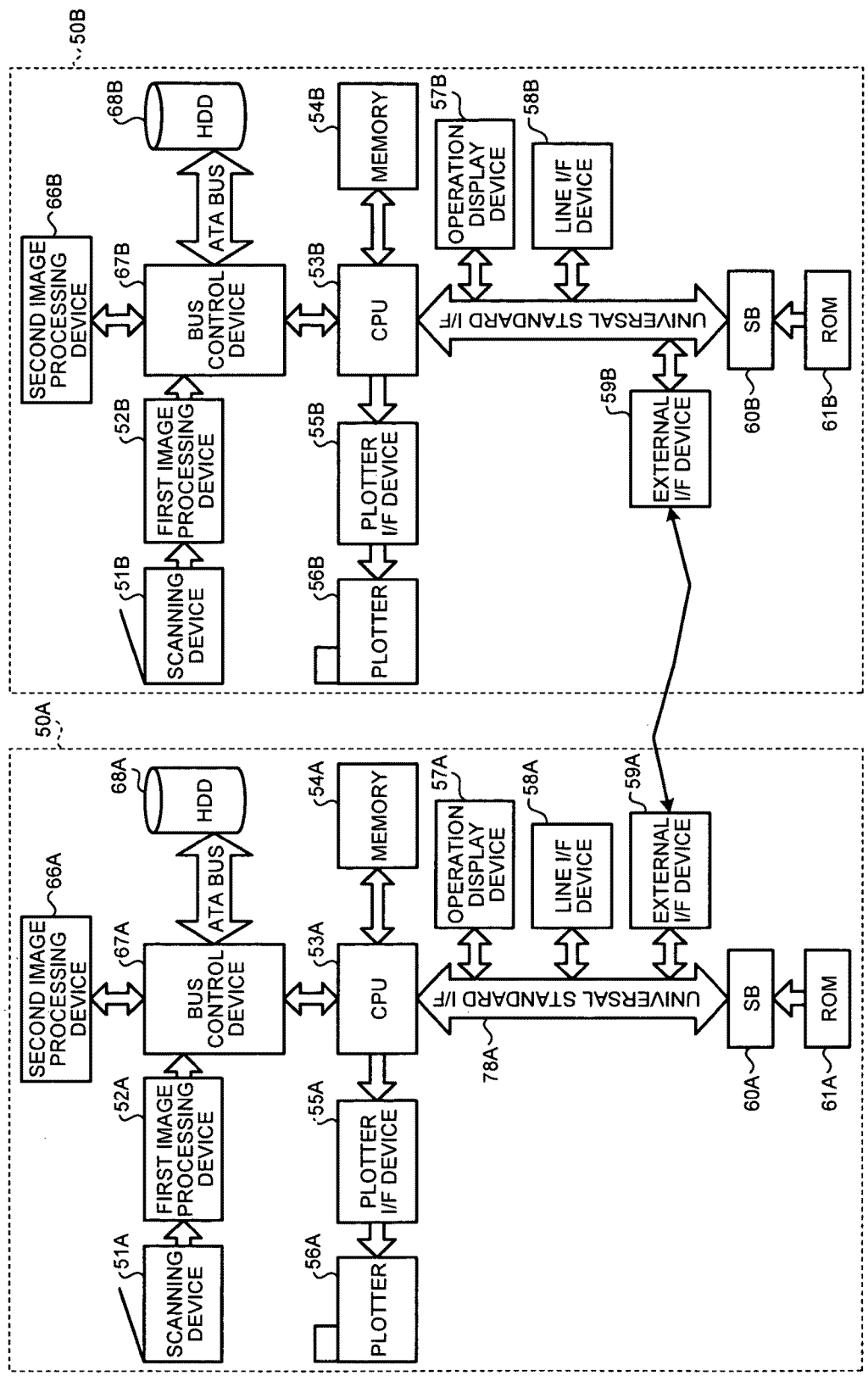
FIG. 16 is a schematic exemplarily illustrating a structure of an image forming system according to a third embodiment of the present invention.

FIG. 16 is a schematic exemplarily illustrating a structure of an image forming system according to the embodiment. The image forming system includes image forming apparatuses 50A and 50B that are coupled through a network. The image forming apparatus 50A includes a scanning device 51A, a first image processing device 52A, a second image processing device 66A, a bus controller 67A, an HDD 68A, a CPU 53A, a memory 54A, a plotter I/F device 55A, a plotter 56A, an operation display device 57A, a line I/F device 58A, an external I/F device 59A, an SB 60A, and an ROM 61A. The image forming apparatus 50B includes a scanning device 51B, a first image processing device 52B, a second image processing device 66B, a bus controller 67B, an HDD 68B, a CPU 53B, a memory 54B, a plotter I/F device 55B, a plotter 56B, an operation display device 57B, a line I/F device 58B, an external I/F device 59B, an SB 60B, and an ROM 61B. In the image forming apparatuses 50A and 50B, the second image processing devices 66A and 66B differ from the second image processing device 66, and the others are the same as those of the first and the second embodiments. Thus, description thereof is omitted. The image forming apparatuses 50A and 50B communicate with each other through the external I/F devices 59A and 59B.

Figure 17:
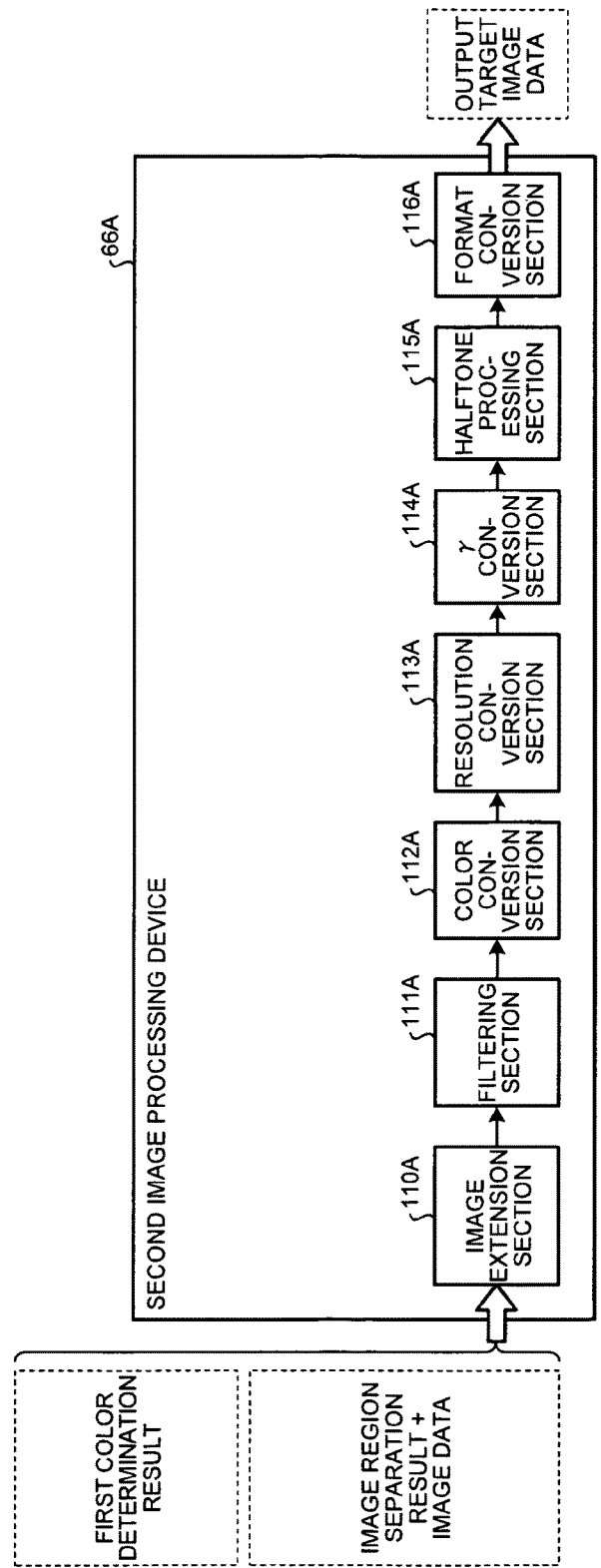
FIG. 17 is a schematic exemplarily illustrating a structure of a second image processing device 66A according to the second embodiment.

FIG. 17 is a schematic exemplarily illustrating a structure of the second image processing device 66A included in the image forming apparatus 50A. The second image processing device 66A includes an image extension section 110A, a filtering section 111A, a color conversion section 112A, a resolution conversion section 113A, a γ conversion section 114A, a halftone processing section 115A, and a format conversion section 116A, and does not include the second color determination section. The sections have the same structures as the first and the second embodiments, and thus, description thereof is omitted.

Figure 18:
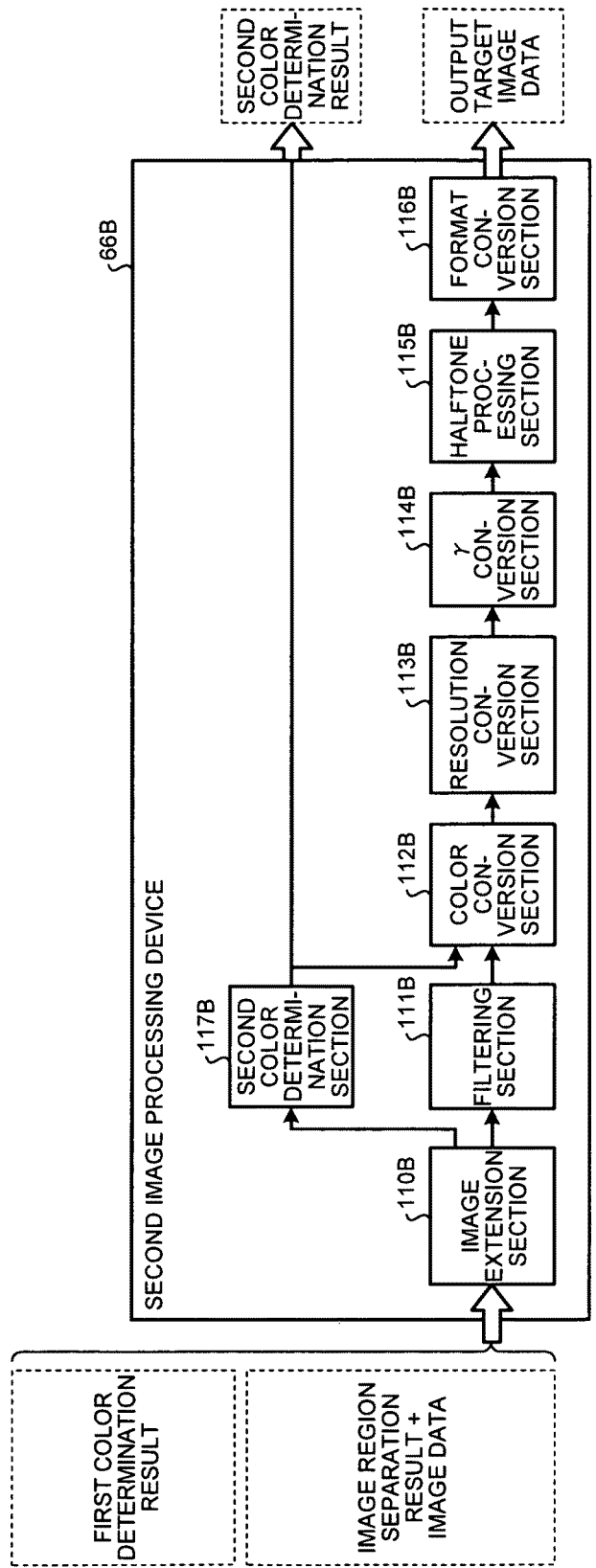
FIG. 18 is a schematic exemplarily illustrating a structure of the second image processing device 66B according to the second embodiment.

FIG. 18 is a schematic exemplarily illustrating a structure of the second image processing device 66B included in the image forming apparatus 50B. The second image processing device 66B includes an image extension section 110B, a filtering section 111B, a color conversion section 112B, a resolution conversion section 113B, a γ conversion section 114B, a halftone processing section 115B, a format conversion section 116B, and a second color determination section 117B. The sections have the same structures as the first and the second embodiments, and thus, description thereof is omitted. The second image processing device 66B can receive image data and supplementary information of the image data that are transmitted from the image forming apparatus 50A. When the second image processing device 66B receives the image data and the supplementary information, the second color determination section 117B carries out color determination processing by using the image data and the supplementary information, and outputs a result of the color determination processing (second color determination result). The CPU 53B transmits the output second color determination result to the image forming apparatus 50A through the external I/F device 59B with an interruption signal.

In the image forming apparatus 50A, when image data stored in the HDD 68A, for example, is output to a different application purpose from that when the image data has been stored, a result of color determination processing carried out by the first color determination section included in the first image processing device 52A may be inappropriate for the different application purpose because the image forming apparatus 50A does not include the second color determination section. However, the image forming apparatus 50A that dose not include the second color determination section can be used in many practical applications for users who do not use image forming apparatuses in a sophisticated manner or want to purchase inexpensive apparatuses. Many users use image forming apparatuses in the following manner. For example, a user purchases one high-end model of an image forming apparatus including the second color determination section (the image forming apparatus 50B, herein) and uses it particularly in a large area in which a plurality of image forming apparatuses are used while the user uses an inexpensive image forming device that does not include the second color determination section (the image forming apparatus 50A, herein) only for a normal use other than the former case. However, some users may request even the low-end image forming apparatus that does not include the second color determination section in its hardware structure, such as the image forming apparatus 50A, to carry out color determination processing on an output target image by the second color determination section. In order to meet such a request, the image forming apparatus 50A can obtain a color determination result of an output image data in the following manner. The image forming apparatus 50A transmits image data to the image forming apparatus 50B serving as an external apparatus through a network. The second color determination section 117B included in the image forming apparatus 50B carries out color determination processing on an output image, and transmits a result of the color determination processing (second color determination result) to the image forming apparatus 50A.

A procedure of processing carried out by the image forming system of the embodiment is described below. Suppose, in the image forming apparatus 50A, operation input that instructs scanning of an image in an original manuscript and a start of storing the image in the original manuscript is carried out, and then the image region separation result and the first color determination result are stored in the HDD 68 as supplementary information by being associated with the image data in the same manner as the first embodiment. A procedure of processing when the image data is reused is different from those of the first and the second embodiments. The reuse procedure is described below in detail. When a user carries out operation input to select image data for reuse through the operation display device 57A of the image forming apparatus 50A, and operation input to instruct a start of reuse processing on the image data, to set the ACS mode, and to designate an output target area in the image in the original manuscript, the operation display device 57A produces control commands according to operation input carried out by the user, and outputs the control commands to the CPU 53A through a universal standard I/F 78A. The CPU 53A receives the control commands produced according to the operation input, and reads out various programs from the ROM 61A so as to execute the programs. The CPU 53A sequentially carries out processing according to the control commands. The CPU 53A instructs the bus controller 67 to read the image data. The bus controller 67, according to the instruction, reads the image data and the supplementary information from the HDD 68A, and sends them to the CPU 53A. The CPU 53A determines an output target image according to the image data, the supplementary information, and the output target area because the ACS mode is set.

In the embodiment, the CPU 53A transmits a request message to the image forming apparatus 50B through the external I/F device 59A and the network so as to cause the image forming apparatus 50B to carry out color determination processing on the output target image. The request message includes image data representing the output target image and supplementary information, and requests the image forming apparatus 50B to carry out color determination processing on the output target image and send a result of the color determination processing to the image forming apparatus 50B. When receiving the request message through the network and the external. I/F device 59B, the CPU 53B of the image forming apparatus 50B stores the image data and the supplementary information that are included in the request message in the memory 54B, and inputs the image data and the supplementary information to the second image processing device 66B. When the second image processing device 66B receives the image data and the supplementary information, the second color determination section 117B carries out color determination processing on the output target image by using the image data and the supplementary information, and outputs a result of the color determination processing (second color determination result). The CPU 53B transmits the second color determination result to the image forming apparatus 50A through the external I/F device 59B and the network with an interruption signal (e.g., one bit signal). The interruption signal indicates "0" when the output target image is determined as an achromatic image as a result of the color determination processing while the interruption signal indicates "1" when the output target image is determined as a chromatic image as a result of the color determination processing, in the same manner as the first embodiment, for example. The CPU 53A of the image forming apparatus 50A can obtain the result of the color determination processing of the output target image (second color determination result) when receiving the interruption signal through the network and the external I/F device 59A. The CPU 53A sends the second color determination result to the color conversion section 112A of the second image processing device 66A. From the sending onward, the second image processing device 66A carries out processing on the output target image in the same manner as the first embodiment.

The output target image data after image processing of the input image data is not needed in the second image processing device 66B of the image forming apparatus 50B, and also is not sent to the plotter 56B, for example. The output target image data may be deleted from the memory 54B, be overwritten by new data, or be output from the image forming apparatus 50B according to the user's operation to be made through the operation display device 57B.

As described in the first embodiment, it is not necessary to carry out color determination processing on an output target image when the first color determination section 100 of the image forming apparatus 50A determines that an image in an original manuscript is an achromatic image and also the output target image is obviously an achromatic image. In such a case, the image forming apparatus 50A does not need to transmit the request message to the image forming apparatus 50B. The image forming apparatus 50A transmits the request message to the image forming apparatus 50B when the output target image is likely to be determined as a chromatic image as described in the second embodiment, for example. As a result, unnecessary communications can be reduced to increase a productivity.

With the above-described structure, even the image forming apparatus 50A that does not include the second color determination section can obtain a result of color determination processing on an output target image in the ACS mode to maintain accuracy of color determination processing.

Fourth Embodiment

A fourth embodiment of the image forming apparatus is described below. The same elements as those seen from the first to the third embodiments are labeled with the same numerals, and description thereof is omitted.

In the fourth embodiment, the following description is made when color determination processing is repeated more than two times. In the first embodiment, output target image data to be output from the second image processing device 66 is output from the plotter 56A by being printed on a transfer sheet or is delivered through the network. In the embodiment, the image forming apparatus 50 stores output target image data to be output from the second image processing device 66 in the HDD 68 together with the second color determination result. The second color determination section 117 included in the second image processing device 66 of the image forming apparatus 50 outputs the second color determination result in the same manner as the second color determination section 117B exemplarily illustrated in FIG. 18. The output target image data stored in the HDD 68 can be reused. That is, output target image data obtained by reusing image data that has been stored in the HDD 68 and represents an image in an original manuscript is stored in the HDD 68, and thereafter the stored output image data can be reused. In this regard, when a part of the output target image is cut out or a magnification ratio is changed so as to be output, the second color determination result may be inappropriate for the output target image that newly serves as an output target. The reason is the same as the case where the first color determination result is inappropriate. Accordingly, the second color determination section 117 carries out color determination processing on a new output target image when necessary. That is, a determination on whether a new output target image is an achromatic image or a chromatic image can be correctly made by letting the second color determination section 117 repeat color determination processing when necessary. The color determination processing can be repeated in the following manner, for example. Image data representing an image in an original manuscript is stored. At the second color determination processing, which is counted since when the image in an original manuscript is stored, image editing processing is properly carried out as required by utilizing the stored image data and color determination processing is carried out on an output target image. At the third color determination processing, image editing processing is properly carried out as required by utilizing the stored image data after the second color determination processing and color determination processing is carried out on a new output target image. At the fourth color determination processing, image editing processing is properly carried out as required by utilizing the stored image data after the third color determination processing and color determination processing is carried out on a new output target image. Repeated image editing processing, however, may adversely affect color determination processing as described above. Other factors may also adversely affect color determination processing.

For example, when a user wants to form a smoother (softer) image than a scanned image in an original manuscript and carries out setting to enhance smoothness of the image, the filtering section 103 of the first image processing device 52 caries out smoothing processing for enhancing the smoothness to smoothen the image. In this case, image data representing the image in the original manuscript to which the smoothing processing has carried out so as to enhance the smoothness is stored in the HDD 68. Accordingly, a user does not need to carry out setting to enhance smoothness of an output image every reuse of the image data. Specifically, the filtering section 103 of the first image processing device 52 carries out filtering such as smoothing processing on the image data in the RGB format to be output from the γ conversion section 102 according to a smoothness level set through the operation display device 57, and outputs the image data after the processing. In smoothing processing, a smoothing amount is increased as the smoothness level is made higher. The bus controller 67 sends the compressed image data to be output from the first image processing device 52, the image region separation result and the first color determination result that serve as the supplementary information of the compressed image data, and filter information indicating that the filtering section 103 has carried out the smoothing processing as additional supplementary information to the CPU 53. The second image processing device 66 receives the compressed data that has been subjected to various processing such as sharpness processing by and then output from the first image processing device 52, the supplementary information of the compressed data, and region designation information through the CPU 53 and the bus controller 67.

When the smoothing processing is carried out, output target images each subjected to color determination processing at the third color determination processing and further color determination processing are markedly changed. A potentially large problem in color determination in the ACS mode is that when a scanning color deviation occurs in the vicinity of a black character or a black line, it is difficult to distinguish a true color from the affected line. If smoothing processing is carried out, a region in the vicinity of the black character in which the scanning color deviation occurs and a truly colored line are also smoothened. The coloring level around a black character on white background has a tendency to lose brightness and chroma. However, if the color deviation is originally large, the coloring is not completely lost. In a worse case, coloring may occur in an area that has been white background before smoothing processing is applied. In addition, when a truly colored line on white background is highly smoothened, chroma of a light color line and a thin line is markedly lowered. When extremely-intense smoothing processing is carried out, a truly colored line and a color character may not be determined as chromatic in color determination processing depending on the setting of a color determination parameter. On the contrary, if the parameter for color determination is set so as to determine them as chromatic, even a colored area having low brightness in the vicinity of a black character may be determined as a chromatic area in color determination processing. As described above, performance of color determination processing is markedly deteriorated in the ACS mode. When enhancement processing for enhancing the sharpness level of an output target image is carried out according to a request by a user who wants to output an image with a brighter color than an image in an original manuscript or reuse the image in the original manuscript, a colored area around a black character increases brightness as described above and a correct result may not be obtained by color determination processing. Accordingly, performance of color determination processing is markedly deteriorated.

In the above description, chroma adjustment is described as an example of color adjustment. All of color processing for changing an RGB difference of an image or chroma corresponding information, such as a case where a user manually adjust a color profile, may adversely affect color determination in the ACS mode. In color determination in the ACS mode, a light color deviation that occurs in the scanning color deviation is not determined as a chromatic because it is determined that an area having lower density than certain density is white, and thus an achromatic. Processing that changes brightness also adversely affects color determination in the ACS mode. When the resolution conversion section 113 carries out magnification change processing for enlarging an input image according to a user's operation input, and a color deviation of a certain amount occurs in an image in an original manuscript scanned by the scanning device 51, i.e., the input image, the size of the color deviation is also enlarged by the magnification change processing. Accordingly, a scanning color deviation amount of an output target image that serves as a target of color determination processing by the second color determination section 117 is effectively enlarged. As a result, color determination processing on the input image may not be correctly carried out.

As described above, additional processing may adversely affect color determination in the ACS mode. Depending on contents of image editing processing, reliability of color determination processing is deteriorated as color determination processing is carried out at later stages of processing. In the embodiment, the image forming apparatus 50 carries out color determination processing when color determination processing is necessary, such as a case in which only a part of a stored image data is reused and output, instead of carrying out color determination processing every time image data is stored and reused. Even when a part of the image data is output, if a magnification ratio in magnification change processing for enlarging an image is 105%, for example, color determination processing does not need to be carried out because most of the image data is output. When an output target image is determined as an achromatic image in color determination processing at a certain stage as described in the first embodiment, there is no need, to carry out color determination processing on a part of the output target image again because a part of the output target image being output is definitely an achromatic image. Alternatively, even if color determination processing is carried out, regardless of the color determination result, the color conversion section 112 may carry out color conversion by using a final color determination result that an output target image is an achromatic image in subsequent color conversion. Since the color determination accuracy decreases as color determination processing is repeated, it is quite possible that a color determination result is erroneous if a color determination result for the output target image is chromatic and a previous color determination result for the output target image is achromatic. Accordingly, when an output target image is once determined as an achromatic image, it is advantageous for a user to maintain the determination in subsequent stages even if the initial determination is erroneous because an image that is actually a chromatic image is erroneously determined as the achromatic image and not the opposite case in which an image that is actually an achromatic image is erroneously determined as a chromatic image. In other words, the determination that an image that is actually an achromatic image is determined as a chromatic image is significantly disadvantageous, and may be the most unacceptable case for a user.

Modified Examples

The present invention is not limited to the above embodiments. The present invention can be embodied by changing components without departing from the spirit and scope of the present invention when practiced. In addition, various aspects of the present invention can be made by properly combining a plurality of components of the above embodiments. For example, some components may be eliminated from an entire list of the components of the above embodiments. Furthermore, the components of different embodiments may be properly combined. Still furthermore, various modifications can be made as exemplarily described below.

In the embodiments, various programs executed by the CPU 53 of the image forming apparatus 50 may be stored in a computer connected to a network such as the Internet, and be provided by being downloaded through the network. The various programs may be recorded with an installable or executable format file in a computer-readable recording medium, and provided. Examples of the computer-readable recording medium include optical recording media such as a CD-ROM, a CD-R, and a digital versatile disk (DVD), magnetic recording media such as a flexible disk (FD), optical magnetic recording media, semiconductor recording media, and a magnetic tape. The whole or a part of the various programs may be built in an operating system (OS), or may be configured so as to function as the OS.

In the embodiments, the first image processing device 52 and the second image processing device 66 are structured with hardware. At least one of functions realized with hardware may be realized by the CPU 53 in executing programs.

In the embodiments, the image forming apparatus 50 is described as a multifunction peripheral as an example. The image forming apparatus 50 is not limited to be applied to the MFP, and can be applied to a copying machine, a printer, and a facsimile, for example. The image forming apparatus 50 may be applied to a system composed of a plurality of devices (e.g., a host computer, an interface device, a scanner, and a printer), or a single device such as the host computer.

In the embodiments, the format conversion section 116 of the image forming apparatus 50 may add a final color determination result to output target image data as bibliographic information, and carry out format conversion on the output target image data so as to produce an image file.

In the embodiments, when the first image processing device 52 carries out enhancement processing, information indicating the carrying out of the enhancement processing is stored together with image data as supplementary information. In reusing image data, when the supplementary information of the image data shows that enhancement processing has been carried out, it may be structured that a user is prohibited from selecting the ACS mode through the operation display device 57. That is, when the first image processing device 52 carries out enhancement processing with an enhancement level equal to or larger than a predetermined level, color determination processing may be cancelled. Alternatively, a user can select the ACS mode through the operation display device 57 when reusing the image data, and after the selection, a warning message may be displayed that a color determination result is highly likely to be erroneous. The above-described structure can promote a user to manually set a color mode before the user suffers a disadvantage due to erroneous determination. However, even in this case, it is determined that an image in an original manuscript is an achromatic image in color determination processing by the first color determination section 100 when an original manuscript, which is entirely achromatic, is scanned, irrespective of whether an output size is different from a size of the original manuscript, or bright coloring occurs due to enhancement processing which is carried out on a region where a scanning color deviation occurs. In this case, the color conversion section 112 carries out color conversion according to an output destination based on the first color determination result regardless of the second color determination result.

In the embodiments, when it is determined that an image in an original manuscript is an achromatic image in color determination processing of the first color determination section 100, the second color determination section 117 may not carry out color determination processing. With this structure, time spent for color determination processing by the second color determination section 117 can be decreased, whereby productivity of image processing can be increased.

In the third embodiment, a determination result on whether an output target image is an achromatic image or a chromatic image may not be correctly obtained when the second color determination section 117B does not carry out color determination processing. In the meantime, the connection between the image forming apparatuses 50A and 50B may be disconnected depending on a state of a network. If the connection is disconnected, a request message and an interruption signal cannot be exchanged between the image forming apparatuses 50A and 50B, and, accordingly, a determination result on whether an output target image is an achromatic image or a chromatic image may not be correctly obtained. In this case, it may be more advantageous for a user to cancel color conversion in the ACS mode than to carry out color conversion by using an inaccuracy color determination processing result in the ACS mode. For example, the cancellation can avoid a user from being suffered from a significant disadvantage that the user carries out operation input again based on erroneous determination so as to carry out copying. In this case, the image forming apparatus 50A causes the operation display device 57A to display a message indicating that a network is disconnected, and cancels color determination processing in the ACS mode, i.e., cancels the determination of a final color determination result on an output target image. The image forming apparatus 50A cancels also image processing, and causes the operation display device 57A to display a message that promotes a user to set a color mode or to couple the image forming apparatus 50B including the second color determination section 117B to the image forming apparatus 50A through the network. Alternatively, the image forming apparatus 50A may not cancel color determination processing or image processing in the ACS mode, and may cause the operation display device 57 to display a warning message indicating that a color determination in the ACS mode is likely to be erroneous, determine a result of color determination processing by a first color determination section 100A (first color determination result) as a final color determination result, and carry out color conversion according to the final color determination result.

In the third embodiment, the image forming system includes the two image forming apparatuses 50A and 50B. The number of image forming apparatuses is not limited to two. The image forming system may include three or more image forming apparatuses. In addition, color determination processing may be repeated by carrying out color determination processing N times (N is an integer which is equal to or larger than one) by a plurality of image forming apparatuses respectively corresponding to image processing carried out for N times. For example, when color determination processing is carried out N times (N is an integer which is equal to or larger than one) respectively corresponding to image processing carried out for N times, if it is determined that an output target image is an achromatic image at the M-th (M is an integer of two or larger) color determination processing, (M+1)-th and later color determination processing may not be carried out, and color conversion may be carried out for the output target image by using the determination result that the output target image is the achromatic image as a final color determination result. With such a structure, there is no need to transmit result of color determination processing at the (M+1)-th color determination processing and those which follow the (M+1)-th color determination processing. As a result, unnecessary communications can be reduced and a productivity drop can be suppressed. When accuracy of color determination processing on image data deteriorates in the ACS mode due to storage and reuse of the image data, e.g., color processing is carried out in reuse of the image data as described in the second embodiment, the image forming apparatus may cancel color determination processing in the ACS mode after the color processing, i.e., cancel the determination of a final color determination result on an output target image. Then, the image forming apparatus may cause the operation display device to display a waning message indicating that a color determination result is likely to be erroneous so as to promote a user to manually set a color mode. When such image data that may cause an accuracy of color determination processing to deteriorate is stored in the HDD 68 and the stored data is reused, a color mode selection may be grayed out in the operation display device 57 so as to disenable a selection of a color mode.

In the fourth embodiment, the second color determination section 117 repeats color determination processing from the third color determination processing onward. The image forming apparatus 50 may further include color determination sections that carry out color determination processing from the third color determination processing onward, e.g., a third color determination section that carries out the third color determination processing and a fourth color determination section that carries out a fourth color determination processing. The color determination processing sections are not necessary included in the image forming apparatus 50. For example, the image forming apparatus 50 is coupled to another image forming apparatus including a same color determination section as the second color determination section 117 through a network as described in the third embodiment. Color determination processing from the third color determination processing onward may be carried out by other image forming apparatuses. Then, the image forming apparatus 50 may acquire a result of the color determination processing through the network. That is, an image forming apparatus including a plurality of color determination sections may be coupled to a plurality of image forming apparatuses each having a color determination section. The image forming apparatus may carry out color determination processing with the color determination sections included therein and the other image forming apparatuses may also carry out color determination processing so as to repeat color determination processing. In this case, for example, when color determination processing is carried out N times (N is an integer which is equal to or larger than one), if it is determined that an output target image is an achromatic image at the M-th ($1 \leq M \leq N$) color determination processing, from the (M+1)-th color determination processing onward, color determination processing may not be carried out, and color conversion may carried out on the output target image by using the determination result that the output target image is the achromatic image as a final color determination result. With such structure, result of color determination processing after the (M+1)-th color determination processing is not needed to be transmitted. As a result, a productivity drop can be suppressed. In the modified example, when accuracy of color determination processing on image data deteriorates in the ACS mode due to storage and reuse of the image data, the image forming apparatus may cancel color determination processing in the ACS mode, and cause the operation display device 57 to display a warning message indicating that a color determination result is highly likely to be erroneous so as to promote a user to manually set a color mode. In addition, when image data that may cause color determination processing accuracy to deteriorate is reused, the image forming apparatus may cause the operation display device 57 to gray out a color mode selection so as to disenable a selection of a color mode.

According to the present invention, determination accuracy can be maintained even if determination on whether an image is an achromatic image or a chromatic image is carried out a plurality of times.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
   a scanning unit that scans a first image that is an image in an original;
   a first image processing unit that carries out first image processing on image data depicting the first image;
   a first determination unit that determines whether the first image in the original scanned by the scanning unit is a chromatic image or an achromatic image;
   a determination control unit that determines whether a second image is a chromatic image or an achromatic image based on at least one of two results: a result of a determination whether a second image serving as a target of second image processing to be performed after the first image processing is a chromatic image or an achromatic image, and a determination result determined by the first determination unit;
   a second image processing unit that carries out the second image processing on the second image based on a result of the determination control unit;
   an input receiving unit that receives operation input instructing to be output from the image in the original and to determine the second image that is an output target image serving as the target to be output from among the images in the original;

a second determination unit that determines the output target image according to the operation input received by the input receiving unit; and a third determination unit that determines whether the output target image determined by the second determination unit is a chromatic image or an achromatic image, wherein the determination control unit determines whether the output target image is a chromatic image or an achromatic image based on at least one result: the determination result determined by the first determination unit and the determination result determined by the second determination unit.

2. The image processing apparatus according to claim 1, wherein the determination control unit determines that the output target image is an achromatic image when the first determination unit determines that the image in the original is an achromatic image, irrespective of the determination result determined by the third determination unit.

3. The image processing apparatus according to claim 1, wherein the determination control unit causes the third determination unit to cancel carrying out the determination and determines that the output target image is an achromatic image when the first determination unit determines that the image in the original is an achromatic image.

4. The image processing apparatus according to claim 1, wherein the first image processing unit carries out the first image processing including image editing processing for editing the image in the original depicted by the image data.

5. The image processing apparatus according to claim 4, wherein the determination control unit determines that the output target image is a chromatic image when the first image processing unit carries out the first image processing including color processing for increasing the number of chromatic pixels in the image in the original depicted by the image data.

6. The image processing apparatus according to claim 5, wherein the determination control unit determines that the output target image is a chromatic image when the first image processing unit carries out the first image processing including color processing that is color conversion processing for converting an achromatic pixel into a chromatic pixel in the image in the original depicted by the image data.

7. The image processing apparatus according to claim 5, wherein the determination control unit determines that the output target image is a chromatic image when the first image processing unit carries out the first image processing including color processing that is under color processing for combining a chromatic image with the image in the original depicted by the image data.

8. The image processing apparatus according to claim 1, further comprising:

a transmission unit that transmits the second image to another image processing apparatus; and a receiving unit that receives a result of a determination on whether the second image is a chromatic image or an achromatic image from the other image processing apparatus, wherein the determination control unit determines whether the second image is a chromatic image or an achromatic image based on at least one result: the determination result received by the receiving unit and the determination result determined by the second determination unit.

9. The image processing apparatus according to claim 8, wherein the determination control unit causes the receiving unit to cancel receiving the determination result from the other image processing apparatus, and determines that the second image is an achromatic image when the second determination unit determines that the first image is an achromatic image.

10. The image processing apparatus according to claim 8, wherein the determination control unit cancels a determination as a result of the determination on the second image when a coupling between the image processing apparatus and the other image processing apparatus is cut and the receiving unit is unable to receive the determination result determined by the second determination unit.

11. The image processing apparatus according to claim 1, further comprising:

a format conversion unit that provides the determination result based on which the second image processing unit carries out the second image processing as bibliographic information together with the output target image data, and converts the output target image data into a set format so as to produce an image file; and an image transmission unit that transmits the image file produced by the format conversion unit to an external device.

12. The image processing apparatus according to claim 1, further comprising an image forming unit that makes an image based on the output target image data output by the second image processing unit and outputs the image being made as such onto a transfer sheet so as to form an image.

13. An image processing apparatus, comprising:

N determination units that are provided so as to correspond to any of image processing carried out for N times and determine whether an image serving as a target of corresponding image processing is a chromatic image or an achromatic image, where N is an integer which is equal to or larger than two;

a determination control unit that determines whether an image serving as a target of each of the image processing from (M+1)-th image processing onward is a chromatic image or an achromatic image based on at least one result between a result of the determination on an image serving as a target of M-th image processing and a result of the determination on the image serving as the target of the (M+1)-th image processing, where M is an integer which is equal to or larger than one; and at least one image processing unit that carries out the image processing on the image serving as the target of each of the image processing from the (M+1)-th image processing onward based on a result of the determination control unit.

14. The image processing apparatus according to claim 13, wherein the determination control unit determines that the image serving as the target of each of the image processing from the (M+1)-th image processing onward is an achromatic image when one of the N determination units, the one corresponding to the M-th image processing, determines that the image serving as the target of the M-th image processing is an achromatic image, irrespective of a result of the determination carried out by one of the N determination units, the one corresponding to the (M+1)-th image processing.

15. The image processing apparatus according to claim 13, wherein the determination control unit causes one of the N determination units, the one corresponding to the (M+1)-th image processing to cancel carrying out the determination, and determines that the image serving as the target of each of the image processing from the (M+1)-th image processing onward is an achromatic image when one of the N determination units, the one corresponding to the M-th image processing, determines that the image serving as the target of the M-th image processing is an achromatic image.

16. The image processing apparatus according to claim 13, wherein the image processing unit carries out the image processing including image editing processing for editing the image serving as the target of the M-th image processing, and the determination control unit determines that the output target image serving as the target of the (M+1)-th image processing is a chromatic image when the image processing unit carries out the M-th image processing including color processing for increasing the number of chromatic pixels in the image serving as the target of the M-th image processing.

17. A computer program product comprising a non-transitory computer-usable medium encoded with a computer executable instructions for image processing in an image processing apparatus that includes a first image processing unit, a first determination unit, a second image processing unit, and a determination control unit, wherein the computer executable instructions causes a computer to perform;

carrying out first image processing on image data depicting a first image by the first image processing unit;

determining whether the first image is a chromatic image or an achromatic image by the first determination unit;

determining whether a second image is a chromatic image or an achromatic image based on at least one of two results: a result of a determination on whether a second image serving as a target of second image processing performed after the first image processing is a chromatic image or an achromatic image, and a result of the first determination unit, to be determined by the determination control unit; and carrying out the second image processing on the second image based on a result of the determination control unit by the second image processing unit.

* * * * *